US008028423B2

United States Patent
Matsuo et al.

(10) Patent No.: US 8,028,423 B2
(45) Date of Patent: Oct. 4, 2011

(54) RECIPROCATING-TYPE CUTTING BLADE DEVICE

(75) Inventors: Katsumi Matsuo, Miki (JP); Yoshinobu Matsuo, Miki (JP)

(73) Assignee: Genpei Hamono Co., Ltd. (JP)

( * ) Notice: Subject to any disclaimer, the term of this patent is extended or adjusted under 35 U.S.C. 154(b) by 0 days.

(21) Appl. No.: 12/744,121

(22) PCT Filed: May 8, 2009

(86) PCT No.: PCT/JP2009/058697
§ 371 (c)(1),
(2), (4) Date: May 21, 2010

(87) PCT Pub. No.: WO2009/142115
PCT Pub. Date: Nov. 26, 2009

(65) Prior Publication Data
US 2011/0047952 A1    Mar. 3, 2011

(30) Foreign Application Priority Data

May 20, 2008  (JP) ................................. 2008-131825
Jun. 11, 2008  (JP) ................................. 2008-152953

(51) Int. Cl.
*B26B 19/02*    (2006.01)
*B26B 19/12*    (2006.01)
(52) U.S. Cl. .......................................... 30/220; 30/216
(58) Field of Classification Search ............. 30/216,
30/220, 210, 173, 223, 122, 353, 519, 296.1,
30/277.4, 515, 228; 83/367, 846, 697; 56/233;
173/162.2
See application file for complete search history.

(56) References Cited

U.S. PATENT DOCUMENTS

| | | | | |
|---|---|---|---|---|
| 3,597,908 A | * | 8/1971 | Schaefer et al. ................ | 56/233 |
| 5,271,154 A | * | 12/1993 | Ohkanda ......................... | 30/216 |
| 5,373,641 A | | 12/1994 | Ohkanda | |
| 5,581,891 A | * | 12/1996 | Wheeler et al. ................ | 30/216 |
| 5,640,771 A | * | 6/1997 | Guerrucci ....................... | 30/132 |
| 5,689,887 A | * | 11/1997 | Heywood et al. .............. | 30/220 |
| 5,875,624 A | * | 3/1999 | Olinger .......................... | 56/244 |
| 5,987,753 A | * | 11/1999 | Nagashima ..................... | 30/216 |
| 6,263,579 B1 | | 7/2001 | Nagashima | |
| 2007/0261253 A1 | * | 11/2007 | Marley ........................... | 30/216 |

FOREIGN PATENT DOCUMENTS

| JP | 7-8067 | 1/1995 |
|---|---|---|
| JP | 8-172838 | 7/1996 |
| JP | 9-28150 | 2/1997 |
| JP | 9-238533 | 9/1997 |
| JP | 9-285217 | 11/1997 |

* cited by examiner

*Primary Examiner* — Arpad Fabian-Kovacs
(74) *Attorney, Agent, or Firm* — Gerald E. Hespos; Michael J. Porco

(57) ABSTRACT

A reciprocating-type cutting blade device (1) has first and second driving bodies (15, 16) driven reciprocatingly in opposite directions. First and second cutting blade bodies (13, 14) are driven reciprocatingly by detachably engaging the first and second driving bodies (15, 16). Two detachable guide plates (11, 12) slidably hold these driving and cutting blade bodies. A first boundary (Q1) is formed between engaging portions (31, 33) of the first cutting blade body (13) and the first driving body (15), and a second boundary (Q2) is formed between engaging portions (32, 34) of the second cutting blade body (14) and the second driving body (16). The boundaries intersect only at points in a planar view, and the engaging portions (31-34) of the cutting blade bodies (13, 14) and the driving bodies (15, 16) maintain this state of intersection over a whole stroke of reciprocating motion.

12 Claims, 22 Drawing Sheets

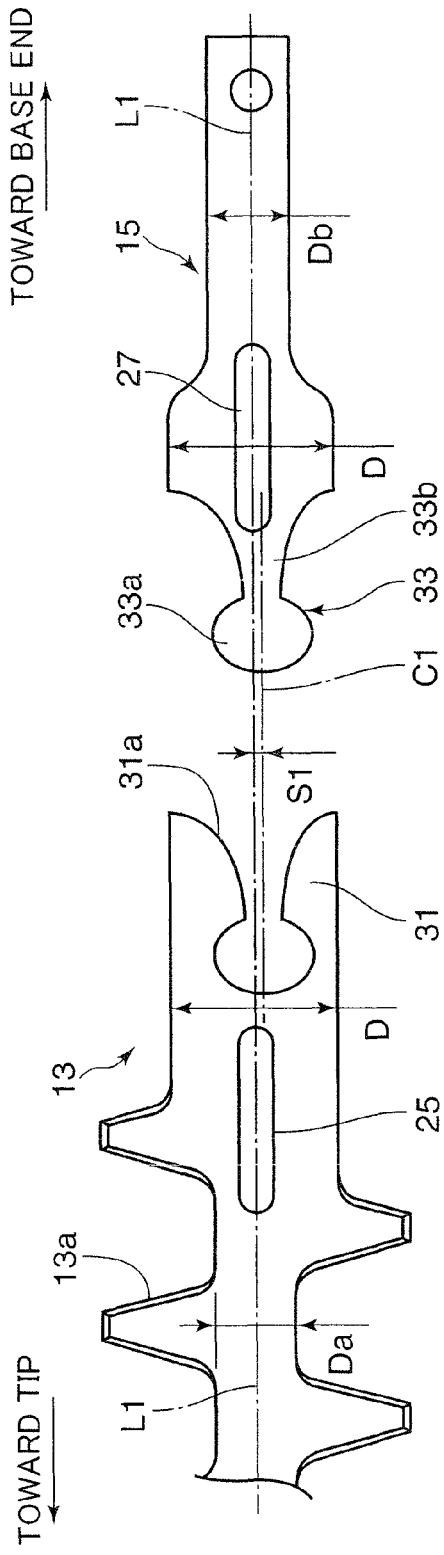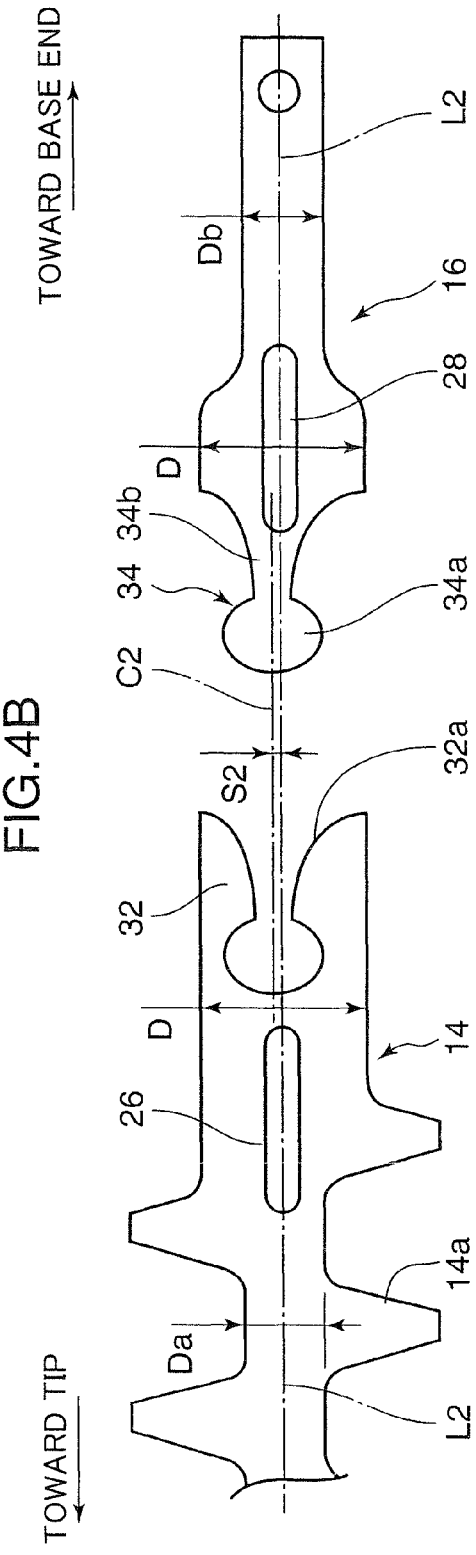

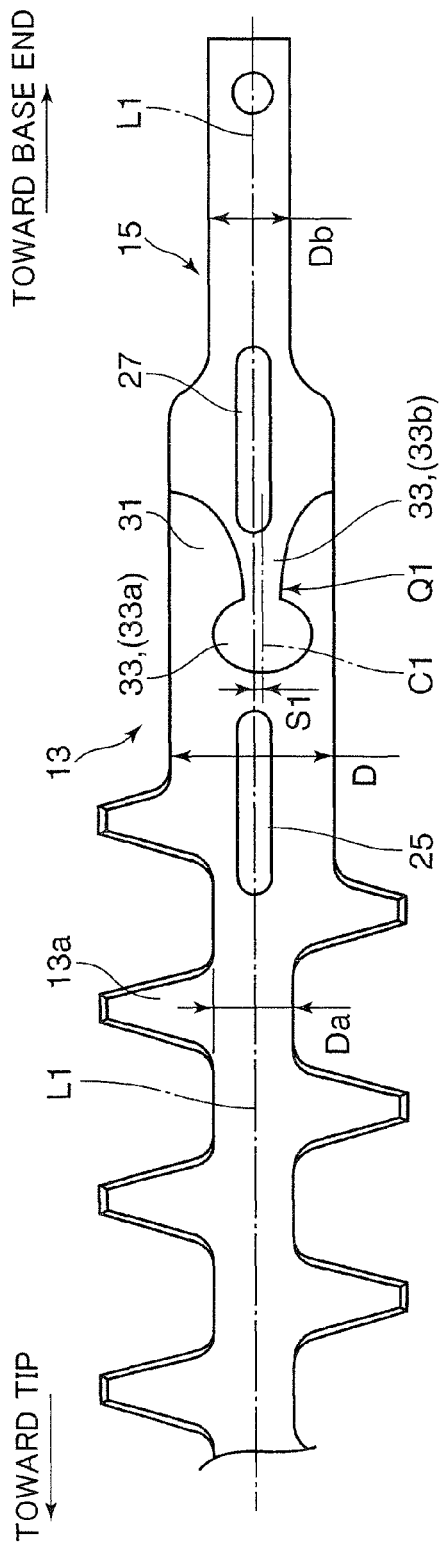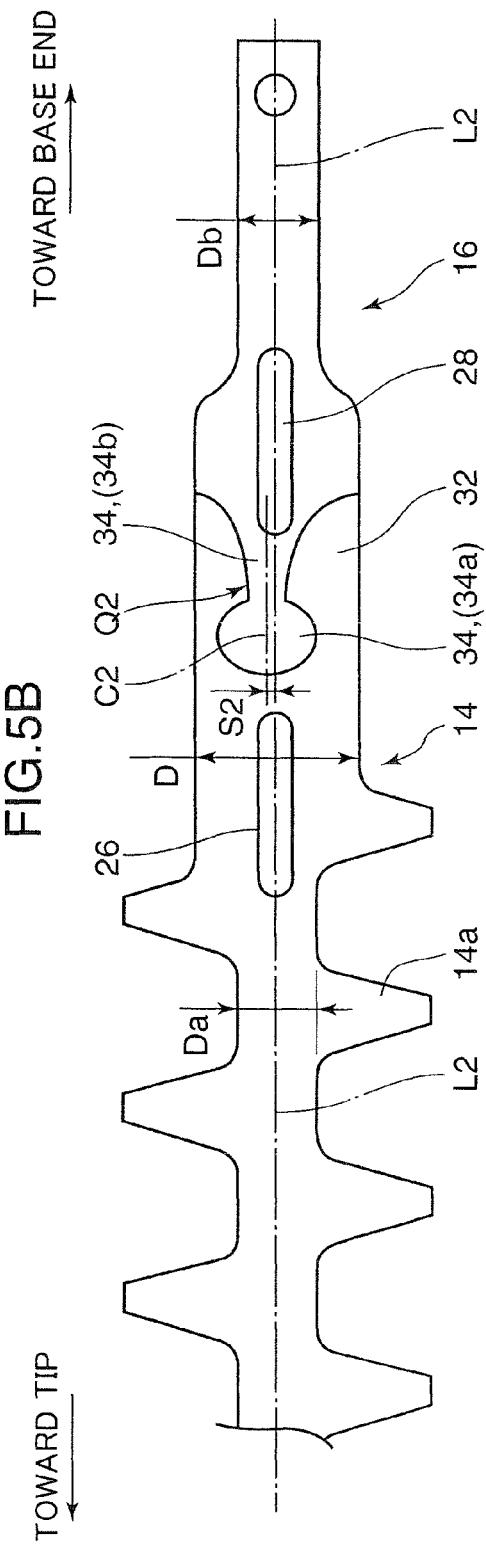

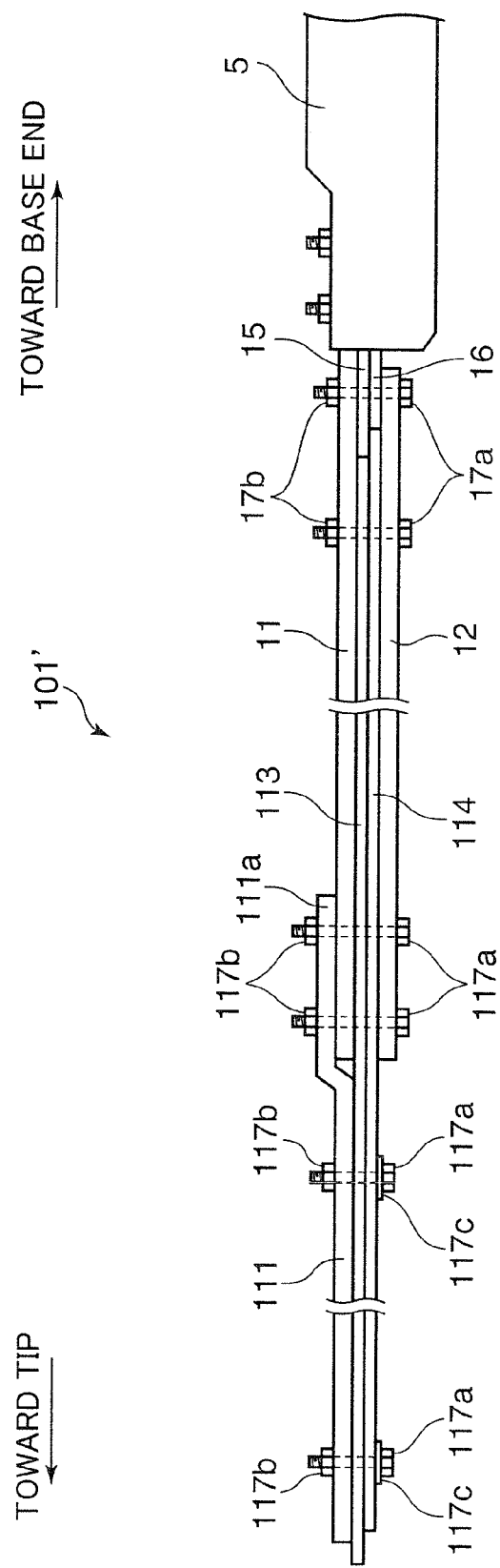

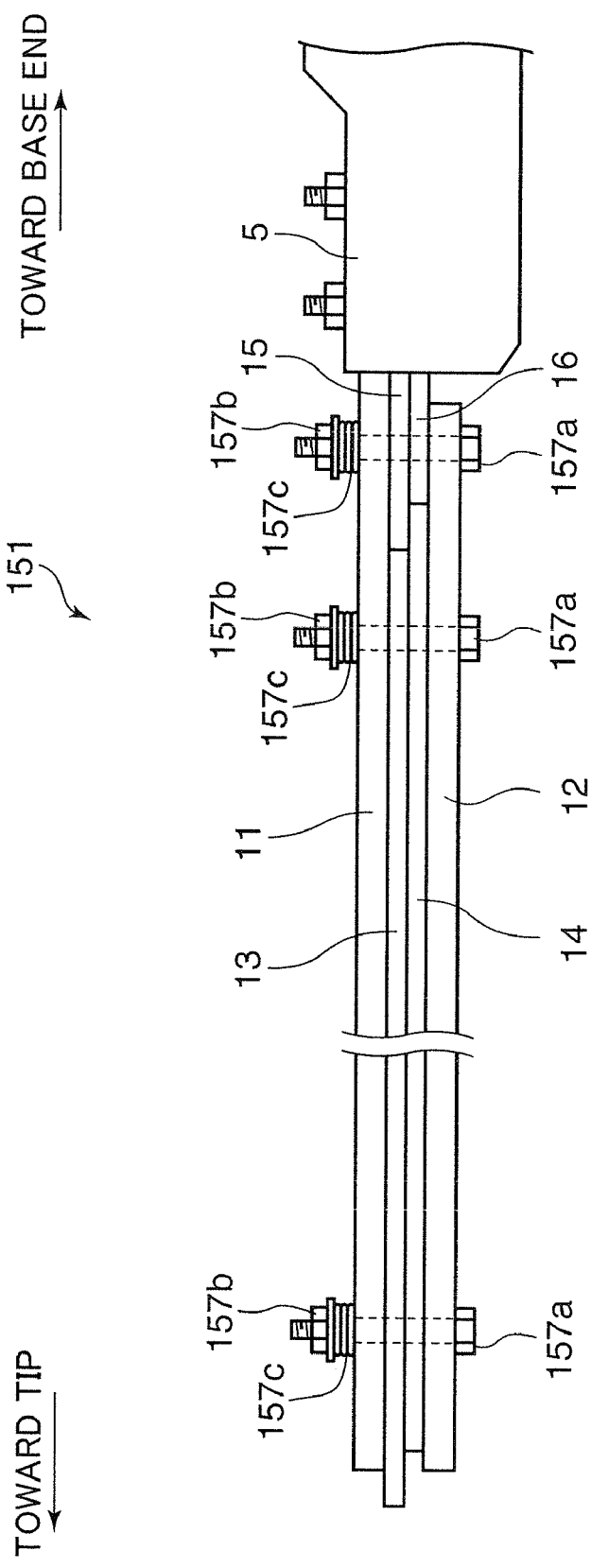

US 8,028,423 B2

RECIPROCATING-TYPE CUTTING BLADE DEVICE

BACKGROUND OF THE INVENTION

1. Field of the Invention

The present invention relates to a reciprocating-type cutting device that has first and second driving bodies formed by a pair of plate-like bodies which are superposed in a thickness direction and reciprocatingly driven in opposite directions by a predetermined driving mechanism, first and second cutting blade bodies formed by a pair of plate-like bodies which are integrally reciprocatingly driven by detachably engaging with non-drive ends of the first and second driving bodies and which have cutting blades having a predetermined shape on lateral edges thereof, and a pair of detachable guide plates which are disposed on both sides of the cutting bodies and driving bodies in the thickness direction so as to hold the cutting bodies and driving bodies slidably.

2. Description of the Related Art

Reciprocating-type cutting blade devices which are used in mowing machines and pruning machines, such as the device disclosed in Japanese Unexamined Patent Publication No. 8-172838 below, for example, are conventionally known. An example of such a device is shown in FIG. 21. A reciprocating-type cutting blade device 200 as shown in FIG. 21 comprises an upper guide plate 201, the base end (the end on the right side of the figure) of which is connected to a mission case (not illustrated), a lower guide plate 202, which is detachably connected to the lower side of the upper guide plate 201, an upper cutting blade body 203 and a lower cutting blade body 204, which are held from both sides between the guide plates 201 and 202 so as to be capable of sliding reciprocatingly therebetween in a longitudinal direction, and an upper driving member 207 and a lower driving member 208 which are reciprocatingly driven in mutually opposite directions by a driving mechanism (not illustrated) that is provided in the mission case. Furthermore, the configuration is such that detachable engagement of respective tips (tips on the non-drive side) of the driving members 207 and 208 with the base ends of the cutting blade bodies 203 and 204 causes the cutting blade bodies 203 and 204 to be reciprocatingly driven integrally with the driving members 207 and 208 in the longitudinal direction.

More specifically, in the example of FIG. 21, keyblade-like connecting parts 203a and 204a having a stepped portion in the width direction are formed at the base ends of the upper cutting blade body 203 and lower cutting blade body 204 respectively, keyblade-like connecting parts 207a and 208a which have a stepped portion in the width direction and which are connected to the connecting parts 203a and 204a by being inserted therein from above or below are formed at the tips of the upper driving member 207 and the lower driving member 208, and the cutting blade bodies 203 and 204 and driving members 207 and 208 are detachably engaged with one another via the connecting parts 203a, 204a, 207a, and 208a respectively.

In the configuration disclosed in Patent Document 1, when the upper cutting blade body 203 and lower cutting blade body 204 are removed, a bolt or the like that connects the upper guide plate 201 and the lower guide plate 202 to each other is first released, and then the lower guide plate 202 is separated from the upper guide plate 201 that is connected to the mission case (not illustrated). If the upper cutting blade body 203 and lower cutting blade body 204 are moved above or below with respect to the driving members 207 and 208 in this state, the cutting blade bodies 203 and 204 can be easily removed from the driving members 207 and 208. Hence, with the configuration of Japanese Unexamined Patent Publication No. 8-172838, there is the advantage that the detachability of the cutting blade bodies 203 and 204 can be improved and maintenance work such as re-grinding the teeth 203b and 204b can be easily performed.

Furthermore, in the abovementioned Japanese Unexamined Patent Publication No. 8-172838, since no particular difference in shape is described between the connecting part 203a of the upper cutting blade body 203 (or the connecting part 207a of the upper driving member 207) and the connecting part 204a of the lower cutting blade body 204 (or the connecting part 208a of the lower driving member 208), these connecting parts are considered to be the same shape. Hence, assuming that the boundary formed between the connecting parts 203a and 207a of the upper cutting blade body 203 and the upper driving member 207 is Q201 and that the boundary formed between the connecting parts 204a and 208a of the lower cutting blade body 204 and the lower driving member 208 is Q202, the boundaries Q201 and Q202 must, in a planar view, coincide with each other once (FIG. 22B) while the cutting blade bodies 203 and 204 make a single stroke, as shown in FIGS. 22A to 22C. Note that, in FIGS. 22A to 22C, the upper cutting blade body 203 and the upper driving member 207 are each denoted by a bold dot-chain line, while the lower cutting blade body 204 and the lower driving member 208 are each denoted by a narrow broken line. Furthermore, when the two boundaries Q201 and Q202 coincide in a planar view as shown in FIG. 22B, there is a risk of interference between steps existing along the boundaries Q201 and Q202, thereby impeding the smooth reciprocating motion of the cutting blade bodies 203 and 204.

In other words, since there is normally a discrepancy owing to dimensional tolerance during manufacture between the thickness dimension of the cutting blade bodies 203 and 204 and the thickness dimension of the driving members 207 and 208, a step is generated by this dimensional tolerance for each of the boundaries Q201 and Q202. Furthermore, if such steps are generated, when the boundaries Q201 and Q202 coincide in a planar view, there is a risk of the steps making contact with each other (interfering each other) due to line contact therebetween, and of the reciprocating motion of the cutting blade bodies 203 and 204 being impeded.

SUMMARY OF THE INVENTION

The present invention was conceived in view of the above issues, and an object of the present invention is to provide a reciprocating-type cutting blade device in which reciprocating motion of cutting blade bodies is smoothed while adequately ensuring their maintainability.

In order to solve the above problems, the present invention is a reciprocating-type cutting blade device that has: first and second driving bodies formed by a pair of plate-like bodies which are superposed in a thickness direction and reciprocatingly driven in opposite directions by a predetermined driving mechanism; first and second cutting blade bodies formed by a pair of plate-like bodies which are integrally reciprocatingly driven by detachably engaging with non-drive side ends of the first and second driving bodies and which have cutting blades having a predetermined shape on lateral edges thereof; and a pair of detachable guide plates which are disposed on both sides of the cutting bodies and driving bodies in the thickness direction so as to hold the cutting bodies and driving bodies slidably, the reciprocating-type cutting blade device being characterized in that a first boundary, which is formed between engaging portions of the first cutting blade body and the first driving body, and a second boundary, which is formed between engaging portions of the second cutting blade body and the second driving body, intersect one another only at points in a planar view, and the engaging portions of the cutting blade bodies and the driving bodies are formed so that this state of intersection is maintained over a whole stroke of reciprocating motion.

BRIEF DESCRIPTION OF THE DRAWINGS

FIGS. 4A and 4B serve to illustrate the connection structure between a cutting blade body and a driving body, where FIG. 4A is a planar view of an exploded state of a first cutting blade body and a first driving body, and FIG. 4B is a planar view of an exploded state of a second cutting blade body and a second driving body.

FIGS. 5A and 5B serve to illustrate the connection structure between a cutting blade body and a driving body, where FIG. 5A is a planar view of an assembled state of a first cutting blade body and a first driving body, and FIG. 5B is a planar view of an assembled state of a second cutting blade body and a second driving body.

FIG. 18 serves to illustrate a modification of the fifth embodiment.

FIG. 19 is a side view of a reciprocating-type cutting blade device according to a sixth embodiment.

DETAILED DESCRIPTION OF THE PREFERRED EMBODIMENTS

Embodiment 1

Figure 1:
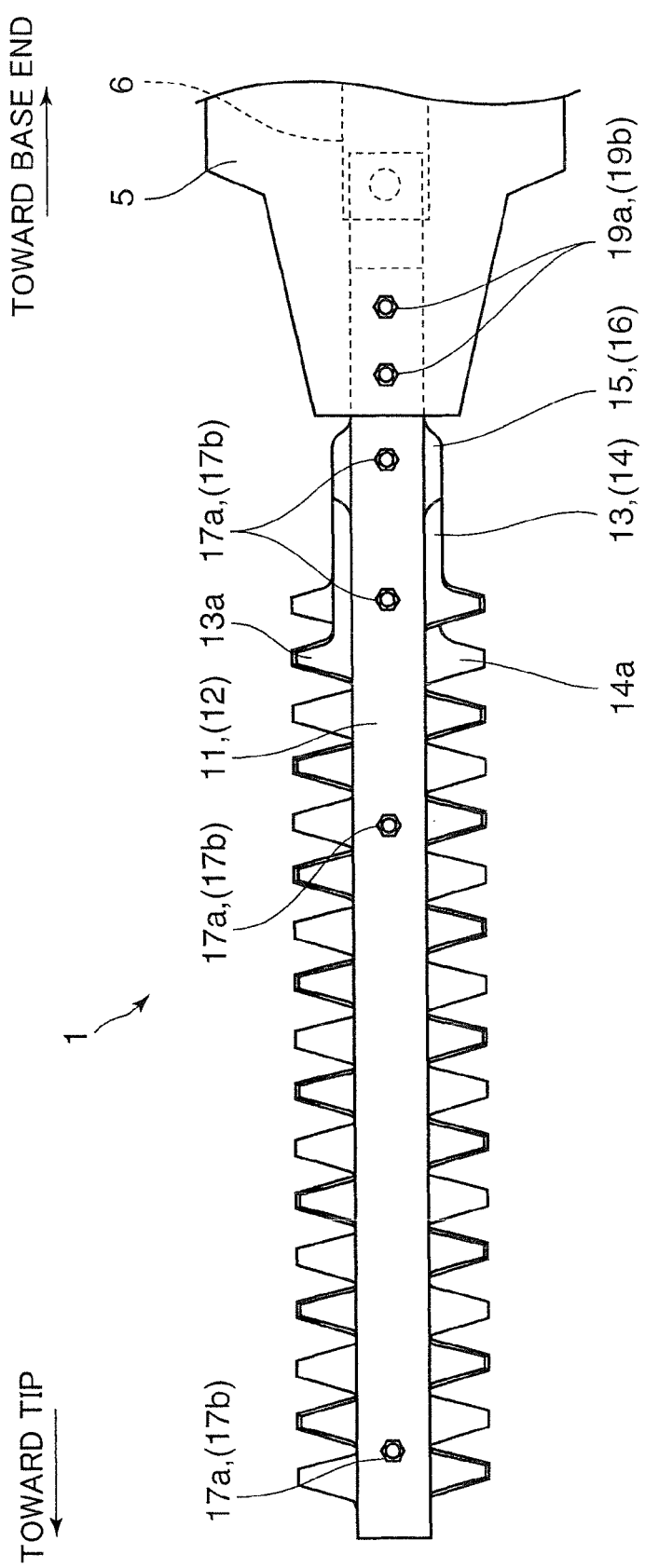
FIG. 1 is a planar view of the overall configuration of a reciprocating-type cutting blade device according to a first embodiment of the present invention.
Figure 2:
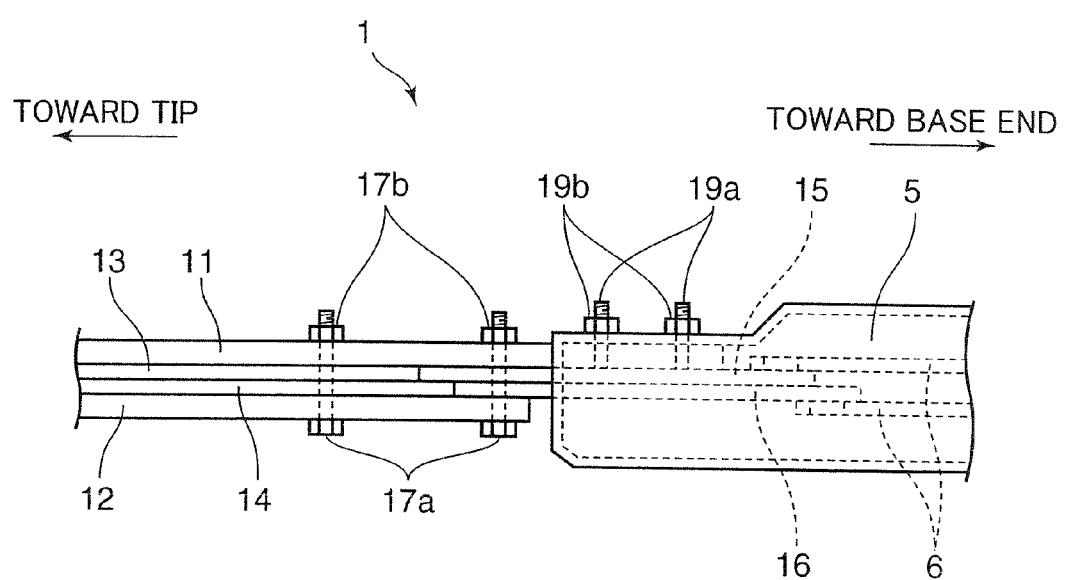
FIG. 2 is a side view of the reciprocating-type cutting blade device.
Figure 3:
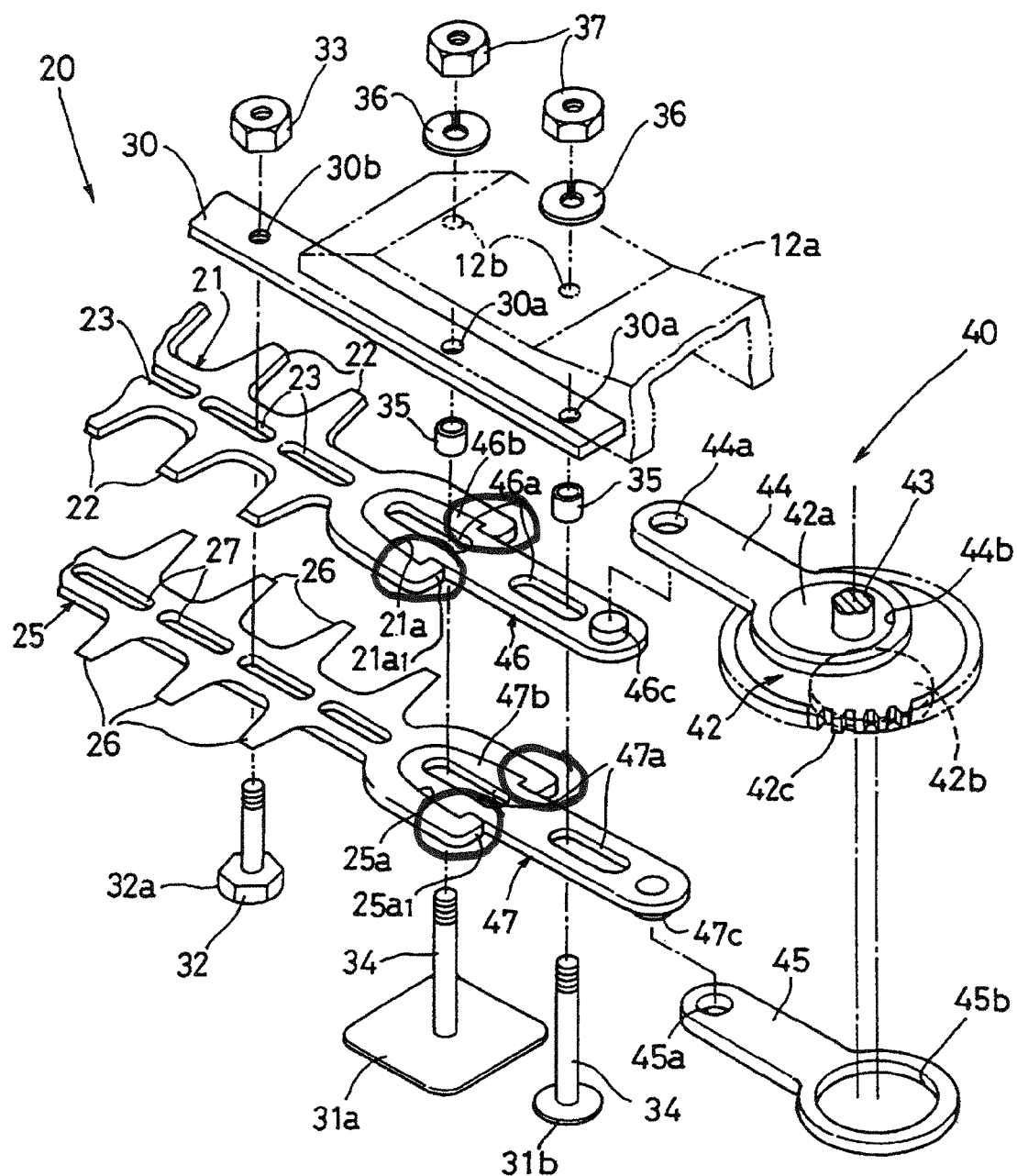
FIG. 3 is an exploded perspective view of the reciprocating-type cutting blade device.

FIGS. 1 to 3 show the overall configuration of a reciprocating-type cutting blade device 1 according to a first embodiment of the present invention. The reciprocating-type cutting blade device 1 shown in FIGS. 1 to 3 comprises a driving mechanism 6 that includes a crank mechanism or the like for converting rotational motion which is input from a driving source such as a reciprocating engine, for example, into reciprocating motion, a mission case 5 which houses the driving mechanism 6, a first guide plate 11 one end of which is connected to the mission case 5 and a second guide plate 12 that is disposed opposite the first guide plate 11, first and second cutting blade bodies 13 and 14, which are held from both sides between the first and second guide plates 11 and 12 so as to be capable of sliding reciprocatingly therebetween in a longitudinal direction, and first and second driving bodies 15 and 16 one end of each of which is linked to the driving mechanism 6 in the mission case 5. Note that ends of the members, i.e. of the guide plates 11 and 12, the cutting blade bodies 13 and 14, and the driving bodies 15 and 16, which are on the side of the mission case 5, are called base ends, and the ends on the opposite side are called tips.

The first and second cutting blade bodies 13 and 14 are connected to the first and second driving bodies 15 and 16 in a longitudinal direction via engaging portions (31, 33, and 32, 34 described subsequently), and the cutting blade bodies 13 and 14 and the driving bodies 15 and 16 are driven reciprocatingly together in response to a driving force in a longitudinal direction that is transmitted from the driving mechanism 6 to the respective driving bodies 15 and 16.

The first and second guide plates 11 and 12 each consists of a plate-like body that is elongated in one direction, and the first and second guide plates 11 and 12 are fixed opposite one another in the thickness direction by being connected together at a plurality of points in the longitudinal direction via bolts 17a and nuts 17b. A pair of male screw members 19a are erected at the base end of the first guide plate 11, and the first guide plate 11 is fixed to the mission case 5 beforehand via the male screw members 19a and nuts 19b that are threaded thereon. Note that the reference symbols 21 and 22 in FIG. 3 are insertion holes which are provided in the guide plates 11 and 12 and into which the bolts 17a are to be inserted.

The first and second cutting blade bodies 13 and 14 consist of a pair of plate-like bodies the left and right edges of which are provided with a plurality of cutting blades 13a and 14a of a predetermined shape (trapezoidal in the illustration), which stand in a line at a predetermined pitch, and the first and second cutting blade bodies 13 and 14 are superposed in the thickness direction and held from both sides between the first and second guide plates 11 and 12 so as to be capable of sliding reciprocatingly therebetween in a longitudinal direction. As shown in FIG. 3, the cutting blade bodies 13 and 14 are provided with a plurality of long-hole-type guide holes 25 and 26 that extend along the longitudinal direction, and the plurality of bolts 17a are attached in a state of being inserted in these guide holes 25 and 26. Furthermore, when the cutting blade bodies 13 and 14 are driven reciprocatingly, motion of the cutting blade bodies 13 and 14 in a longitudinal direction is guided as a result of the peripheral edges of the guide holes 25 and 26 slidably contacting the bolts 17a.

The first and second driving bodies 15 and 16 consist of a pair of plate-like bodies which are superposed in the thickness direction and which engage with the base ends of the first and second cutting blade bodies 13 and 14, and a tip-end part of the driving bodies 15 and 16 is disposed between the guide plates 11 and 12, while a base-end part of the driving bodies 15 and 16 is inserted in the mission case 5 and connected to the driving mechanism 6. As shown in FIG. 3, the first and second driving bodies 15 and 16 are respectively provided with long-hole-shaped guide plates 27 and 28 that extend in the longitudinal direction, while the bolt 17a closest to the base end is attached in a state of being inserted in the guide holes 27 and 28. The configuration is such that the first and second cutting blade bodies 13 and 14 and the driving bodies 15 and 16 undergo integral reciprocating motion when the driving bodies 15 and 16 are reciprocatingly driven in mutually opposite directions by the driving mechanism 6 while being guided in the longitudinal direction by a guide mechanism that includes the bolts 17a and bolt holes 27 and 28.

The reciprocating-type cutting blade device 1 with the above configuration is used as a device that constitutes an essential part of a mowing machine or pruning machine, for example. In other words, in the reciprocating-type cutting blade device 1, a drive source comprising a reciprocating engine or the like is connected to the driving mechanism 6 via a clutch device or the like, and an operating handle for manual operation that is gripped by the operator is attached to the mission case 5 (none of these parts is illustrated). Furthermore, the configuration is such that, if the operator sets the drive source in motion, the cutting blade bodies 13 and 14 are reciprocatingly driven at high speed, and a cut body such as vegetation is cut by the cutting blades 13a and 14a.

A structure that allows the first and second driving bodies 15 and 16 and the first and second cutting blade bodies 13 and 14 to engage with each other will be described next using FIGS. 3, 4A, 4B, 5A and 5B. Note that FIGS. 4A and 4B are planar views of the driving bodies 15 and 16 and the cutting blade bodies 13 and 14 in an exploded state, and FIGS. 5A and 5B are planar views thereof in an assembled state.

If we first describe the connection structure of the first cutting blade body 13 and the first driving body 15, the first cutting blade body 13 and the first driving body 15 are detachably connected via an engaging portion 31 and an engaging portion 33 that are provided at the respective opposite ends of the first cutting blade body 13 and the first driving body 15. Among these engaging portions, the engaging portion 33 of the first driving body 15 is constituted by a protrusion of a predetermined shape that is provided protrudingly at the tip of the first driving body 15 in a longitudinal direction. More specifically, the engaging portion 33 comprises a substantially circular top portion 33a that is located closest to the tip of the first driving body 15 and a flared portion 33b that gradually widens as this portion extends toward the base end, and the overall outline of the engaging portion 33 is curved.

Meanwhile, the base end of the first cutting blade body 13 is provided with an engaging portion 31 which includes a recess 31a that corresponds to the shape of the engaging portion 33 (the top portion 33a and the flared portion 33b), as shown in FIG. 5A. The inner contour of the engaging portion 31 is completely curved like the engaging portion 33.

As shown in FIGS. 4A and 5A, the ends on the respective side of the engaging portions 31 and 33 of the first cutting blade body 13 and the first driving body 15 are formed relatively wide in comparison with the other parts. More specifically, supposing that the maximum width dimension of the base end of the first cutting blade body 13 where the engaging portion 31 is provided and the maximum width dimension of the tip of the first driving body 15 where the engaging portion 33 is provided are both D1, the width dimension D1 is set to a value a predetermined amount larger than a width dimension Db at the base end side of the first driving body 15 and a maximum width dimension Da of a part obtained by excluding the cutting blade 13a from the tip area of the first cutting blade body 13 (an area closer to the tip than the engaging portion 31).

Furthermore, a center line C1 of the engaging portions 31 and 33 of the first cutting blade body 13 and the first driving body 15 is formed offset by a predetermined distance S1 relative to an axis L1 of the first cutting blade body 13 and the first driving body 15 on one side in the width direction. Note that the center line C1 of the engaging portions 31 and 33 may be said to pass through the center, in a width direction, of the tip of the flared portion 33b (connection with the top portion 33a) and through the center of the narrowest portion of the recess 31a corresponding to the tip of the flared portion 33b. Accordingly, the engaging portions 31 and 33 are each formed with an asymmetrical shape relative to the axis L1 of the first cutting blade body 13 and the first driving body 15.

Meanwhile, the connection structure of the second cutting blade body 14 and the second driving body 16 is basically the same as described above. In other words, the tip of the second driving body 16 is provided with an engaging portion 34 which is formed by a protrusion having a top portion 34a and a flared portion 34b, and the base end of the second cutting blade body 14 is provided with an engaging portion 32 which includes a recess 32a corresponding to the shape of the engaging portion 34, such that the second cutting blade body 14 and the second driving body 16 are detachably connected via these engaging portions 32 and 34. The engaging portions 32 and 34 have an inner contour or outer outline that is completely curved like the engaging portions 31 and 33 of the first cutting blade body 13 and first driving body 15.

The width dimensions of each of the parts of the second cutting blade body 14 and second driving body 16 are the same as those for the first cutting blade body 13 and the first driving body 15. In other words, the maximum width dimension of the ends on the respective side of the engaging portions 32 and 34 of the second cutting blade body 14 and the second driving body 16 (that is, the base end portion of the second cutting blade body 14 and the tip portion of the second driving body 16), the width dimension at the base end side of the second driving body 16, and the width dimension of a part excluding the cutting blade 14a from the second cutting blade body 14 are D, Da, and Db in that order, and their sizes are related such that D>Da, Db, like the first cutting blade body 13 and the first driving body 15.

Furthermore, the engaging portions 32 and 34 of the second driving body 14 and the second driving body 16 are formed, as shown in FIGS. 4B and 5B, with their centre line C2 offset by a predetermined distance S2 on one side in a width direction relative to an axis L2 of the second cutting blade body 14 and the first driving body 16. However, the orientation of the offset amount S2 is set opposite the orientation of the offset amount S1 (see FIGS. 4A and 5A) of the engaging portions 31 and 33 of the first cutting blade body 13 and the first driving body 15. In other words, by setting the orientations of the offset amounts S1 and S2 of the centre line in opposite directions, the engaging portion 33 of the first driving body 15 (or the engaging portion 31 of the first cutting blade body 13) and the engaging portion 34 of the second driving body 16 (or the engaging portion 32 of the second cutting blade body 14) have different planar shapes when viewed from one side in the thickness direction.

Here, when the offset amount S1 of the engaging portions 31 and 33 of the first cutting blade body 13 and the first driving body 15 is compared with the offset amount S2 of the engaging portions 32 and 34 of the second cutting blade body 14 and the second driving body 16, the two offset amounts S1 and S2 only differ in their orientation and are the same in terms of the absolute values of their dimensions. Furthermore, the cutting blades 13a and 14a which are respectively provided on the left and right edges of the first and second cutting blade bodies 13 and 14 are disposed so as to possess linear symmetry to one another in a state where the cutting blade bodies 13 and 14 are disposed as in FIGS. 5A and 5B. Note that the shapes of the other parts are all the same. In other words, the first and second cutting blade bodies 13 and 14 and the first and second driving bodies 15 and 16 are each identical parts, with respective upper and lower sides thereof being mutually inverted.

Figure 6:
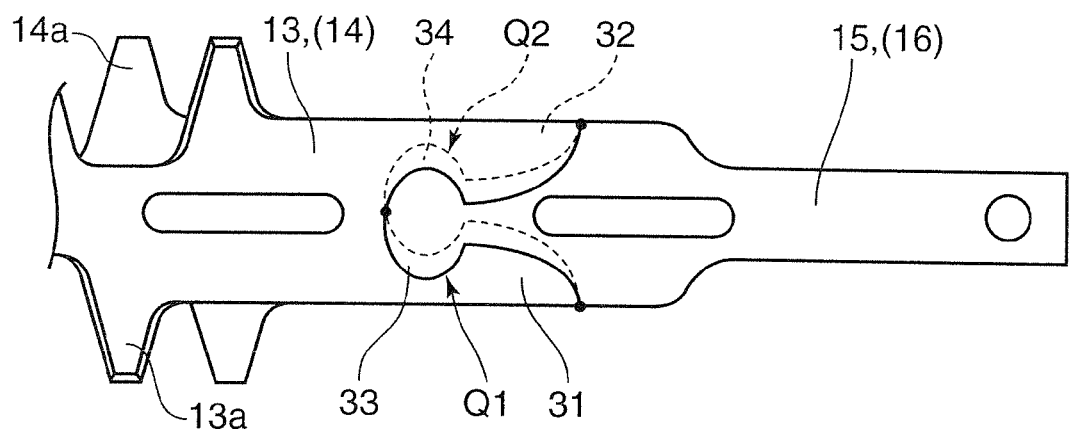
FIG. 6 is a planar view of a state where the first cutting blade body and the first driving body and the second cutting blade body and the second driving body are superposed on one another in a thickness direction.

FIG. 6 shows a state where the first cutting blade body 13 and the first driving body 15 and the second cutting blade body 14 and the second driving body 16 are each combined and superposed in the thickness direction. In the superposed state shown in FIG. 6, a first boundary Q1, which is formed between the engaging portions 31 and 33 of the first cutting blade body 13 and the first driving body 15, and a second boundary Q2, which is formed between the engaging portions 32 and 34 of the second cutting blade body 14 and the second driving body 16, intersect one another only at points in a planar view. In other words, the first and second boundaries Q1 and Q2 formed between the engaging portions 31 and 33 and the engaging portions 32 and 34 as above are constituted by a curved line alone and are shaped differently. Hence, in a superposed state as shown in FIG. 6, there are no parts exhibiting linear coincidence between the two boundaries Q1 and Q2 in a planar view, and the two lines intersect one another only at points. Note that in FIG. 6 points of intersection between the two boundaries Q1 and Q2 are denoted by black dots.

Figure 7:
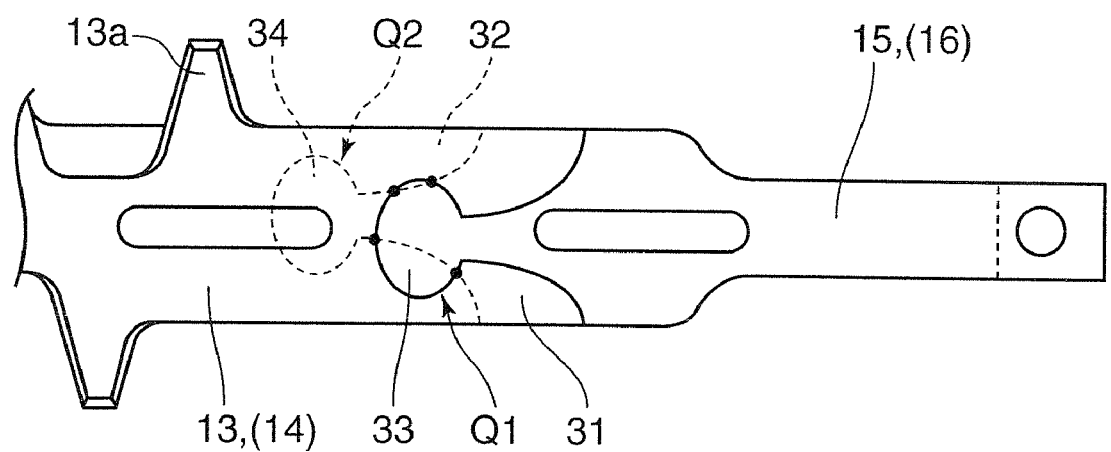
FIG. 7 is a planar view of a state where the first cutting blade body is located closest to the base end-side of the stroke range and where the second cutting blade body is located closest to the tip side of the stroke range.
Figure 8:
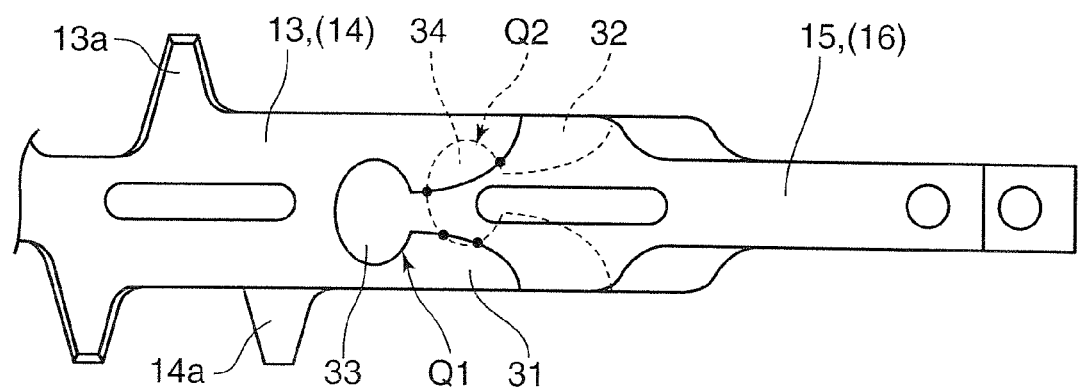
FIG. 8 is a planar view of a state where the first and second cutting blade bodies are moved to the opposite ends from FIG. 7.

FIGS. 7 and 8 show a state in which the two boundaries Q1 and Q2 are displaced to the maximum in the longitudinal direction as a result of the first and second cutting blade bodies 13 and 14 being reciprocatingly driven in opposite directions in the longitudinal direction together with the first and second driving bodies 15 and 16. More specifically, FIG. 7 shows a state in which the first cutting blade body 13 is located closest to the base end-side of the stroke range and the second cutting blade body 14 is located closest to the tip side of the stroke range. FIG. 8 shows a state where the first cutting blade body 13 and the second cutting blade body 14 have been moved to the opposite end of the stroke range. As these figures show, even in a state where the first and second cutting blade bodies 13 and 14 have been moved in opposite directions to both the respective ends of the stroke range, the boundary Q1 between the first cutting blade body 13 and the first driving body 15 and the boundary Q2 between the second cutting blade body 14 and the second driving body 16 are not completely separate in the longitudinal direction and partially overlap one another. Also, in this state, there are no parts that exhibit linear coincidence between the two boundaries Q1 and Q2, and the two boundaries intersect one another only at points. In other words, with the above configuration, it is clear that the shape and size of the engaging portions 31 to 34 of the cutting blade bodies 13 and 14 and the driving bodies 15 and 16 are set so that a state where the two boundaries Q1 and Q2 intersect one another only at points is always maintained over a whole stroke of reciprocating motion.

When mowing work is performed using the reciprocating-type cutting blade device 1 with the above configuration, since the cutting blades 13a and 14a of the first and second cutting blade bodies 13 and 14 repeatedly slide against vegetation and so forth, the sharpness of the cutting blade bodies 13 and 14 may deteriorate. Further deterioration reduces the efficiency of the mowing work or the like, and therefore the cutting blades 13a and 14a of the cutting blade bodies 13 and 14 must be ground once again at regular intervals. Such regrinding work is carried out in a state where the reciprocating-type cutting blade device 1 has been disassembled and the cutting blade bodies 13 and 14 have been removed.

The procedure for removing the first and second cutting blade bodies 13 and 14 will be described next. To remove each of the cutting blade bodies 13 and 14, the bolts 17a and nuts 17b connecting the first and second guide plates 11 and 12 (see FIGS. 1 to 3) to one another are unfastened, and the second guide plate 12 is separated from the first guide plate 11 which has its base end connected to the mission case 5. Furthermore, the second cutting blade body 14, thus exposed to the outside, is removed from the second driving body 16 by undergoing relative motion in the thickness direction (downward in the figure), whereupon the first cutting blade body 13 is removed from the first driving body 15 by the same procedure. Here, if the positions of the first and second driving bodies 15 and 16 in the longitudinal direction are displaced in a fore-aft direction (more specifically, if the first driving body 15 is displaced closer to the tip than the second driving body 16), removal of the first cutting blade body 13 will be straightforward.

Thus, with the structure of the reciprocating-type cutting blade device 1 of this embodiment, the cutting blade bodies 13 and 14 can be easily removed, and the operator is easily able to perform the work of regrinding the cutting blades 13a and 14a on the disassembled individual cutting blade bodies 13 and 14.

Note that the opposite procedure from the above procedure may be followed in order to re-attach the removed cutting blade bodies 13 and 14 and restore the reciprocating-type cutting blade device 1 to an assembled state. In other words, the assembly of the reciprocating-type cutting blade device 1 is complete once the cutting blade bodies 13 and 14 have been made to engage with the driving bodies 15 and 16 by approaching same in the thickness direction and the second guide plate 12 has been fastened to the first guide plate 11 in this state via the bolts and nuts 17a and 17b.

When the reciprocating-type cutting blade device 1 is thus assembled, the bolts and nuts 17a and 17b connecting the first and second guide plates 11 and 12 must be fastened with a suitable fastening torque. In other words, when the fastening torque of the bolts and nuts 17a and 17b is excessively large, the sliding resistance of the first and second cutting blade bodies 13 and 14, which are held from both sides between the two guide plates 11 and 12, increases, and smooth reciprocating motion is prevented, whereas when the fastening torque is too small, the rattle of the cutting blade bodies 13 and 14 in the thickness direction increases and the reciprocating motion is not smooth.

Figure 9A:
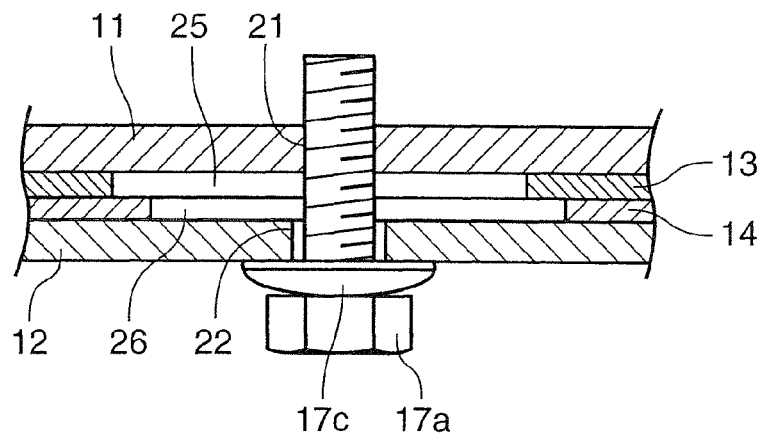
FIGS. 9A to 9C serve to illustrate specific examples of a nut and bolt structure for connecting the first and second guide plates.
Figure 9B:
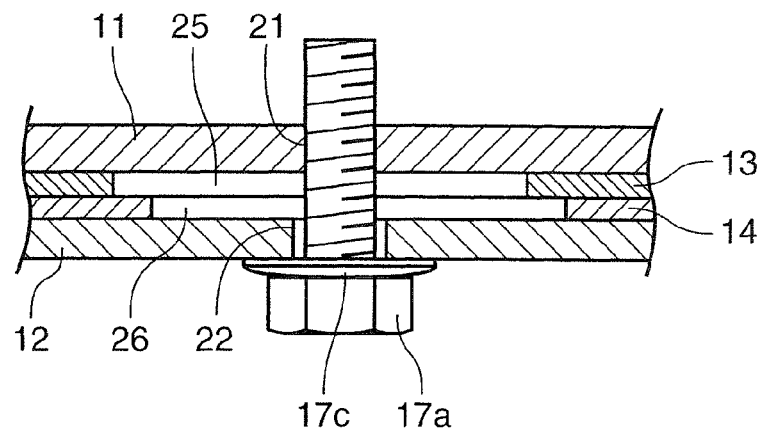
Figure 9C:
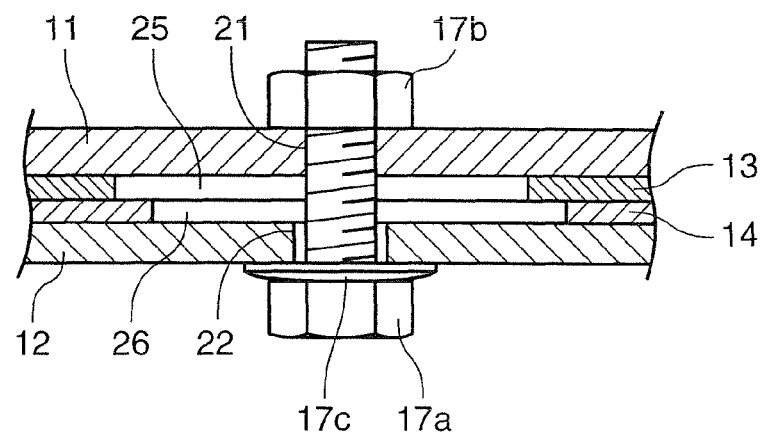

In order to avoid the situation described above and always fasten the bolts and nuts 17a and 17b with a predetermined torque, usage of a spring washer 17c, as shown in FIGS. 9A to 9C, for example, has been considered here. In other words, in FIGS. 9A to 9C, a dish-like spring washer 17c is provided between the head of the bolt 17a and the second guide plate 12. Furthermore, a female screw is formed on the inner peripheral surface of the insertion hole 21 of the first guide plate 11 in order to screw together the female screw and shaft of the bolt 17a.

FIG. 9A shows a state where the bolt 17a is fastened with the head of the bolt 17a abutting against the spring washer 17c. When, starting from this state, the bolt 17a is tightened further with a predetermined fastening torque, as shown in FIG. 9B the spring washer 17c is crushed by a predetermined amount by the head of the bolt 17a. The extent to which the spring washer 17c is crushed varies in proportion to the fastening torque of the bolt 17a, and the operator is therefore always able to fasten the bolt 17a with a predetermined fastening torque by identifying the crushing degree of the spring washer 17c. Furthermore, as shown in FIG. 9C, if the nut 17b is fixed to the shaft of the bolt 17a from the side of the first guide plate 11, locking of the bolt 17a is possible, and consequently the first and second cutting blade bodies 13 and 14 are always held from both sides with an appropriate force and thus maintained in a state of being capable of sliding reciprocatingly.

Note that instead of the structure shown in FIGS. 9A to 9C, two types of spring washers (or ringlike spring members) of a different repulsion force may also be used in combination. With this configuration, when the bolt 17a is fastened, the bolt 17a is first fastened against a weak repulsion force before progressing to a stronger repulsion force. The operator is subsequently always able to fasten the bolt 17a with a predetermined fastening torque by being sensitive to variations in repulsion force.

As described hereinabove, the reciprocating-type cutting blade device 1 of the first embodiment has first and second driving bodies 15 and 16 formed by a pair of plate-like bodies which are superposed in a thickness direction and reciprocatingly driven in opposite directions by a predetermined driving mechanism 6, first and second cutting blade bodies 13 and 14 formed by a pair of plate-like bodies which are integrally reciprocatingly driven by detachably engaging with the respective non-drive ends (tips) of the first and second driving bodies 15 and 16, and which have cutting blades 13a and 14a having predetermined shape on lateral edges thereof, and a pair of detachable guide plates 11 and 12 which are disposed on both sides of the cutting blade bodies 13 and 14 and driving bodies 15 and 16 in the thickness direction so as to hold the cutting blade bodies 13 and 14 and driving bodies 15 and 16 slidably. Furthermore, the first boundary Q1 that is formed between the engaging portions 31 and 33 of the first cutting blade body 13 and the first driving body 15, and the second boundary Q2 that is formed between the engaging portions 32 and 34 of the second cutting blade body 14 and the second driving body 16 intersect one another only at points in a planar view, and the engaging portions 31 to 34 of the cutting blade bodies 13 and 14 and the driving bodies 15 and 16 are formed so that this state is maintained over a whole stroke of reciprocating motion. With this configuration, there is the advantage that the reciprocating motion of the cutting blade bodies 13 and 14 can be effectively smoothed while adequately ensuring their maintainability.

In other words, in the above first embodiment, the first and second cutting blade bodies 13 and 14 are detachably engaged with the first and second driving bodies 15 and 16 which are reciprocatingly driven by the driving mechanism 6, and since these members are slidably held from both sides between a detachable pair of guide plates 11 and 12, the operator is able to easily remove the cutting blade bodies 13 and 14 from the driving bodies 15 and 16 once the pair of guide plates 11 and 12 have been separated, and is easily able to perform maintenance work such as re-grinding the cutting blades 13a and 14a of the cutting blade bodies 13 and 14 in a state where the cutting blade bodies 13 and 14 have been removed thus.

Moreover, the first boundary Q1, which is formed between the engaging portions 31 and 33 of the first cutting blade body 13 and the first driving body 15, and the second boundary Q2, which is formed between the engaging portions 32 and 34 of the second cutting blade body 14 and the second driving body 16, intersect one another only at points over a whole stroke of reciprocating motion, and therefore even in cases where steps caused by discrepancies in the thickness dimensions of the cutting blade bodies 13 and 14 and the driving bodies 15 and 16 are generated in the respective parts of the boundaries Q1 and Q2, for example, there is no line contact between these steps, and therefore obstruction of the reciprocating motion of the cutting blade bodies 13 and 14 which would otherwise be caused by interference due to such line contact can be effectively avoided. As a result, the reciprocating motion of the cutting blade bodies 13 and 14 can be effectively smoothed while adequately ensuring their maintainability, and the performance of the reciprocating-type cutting blade device 1 can be raised in order to improve workability effectively.

More specifically, in the above first embodiment, the first and second boundaries Q1 and Q2 are formed only by curves having different shapes in a planar view by forming the engaging portions 31 to 34 of the cutting blade bodies 13 and 14 and the driving bodies 15 and 16. With this configuration, there is the advantage that a state where the two boundaries Q1 and Q2 only intersect at points can be suitably established as described earlier, thereby reliably ensuring smooth reciprocating motion for the cutting blade bodies 13 and 14.

In the above first embodiment in particular, the first and second cutting blade bodies 13 and 14 and the first and second driving bodies 15 and 16 each comprise identical parts that include engaging portions 31 to 34, which are asymmetrical with respect to the axes L1 and L2, and one of the cutting blade bodies and one of the driving bodies (13, 15 or 14, 16) are attached to the other one of the cutting blade bodies and the other one of the driving bodies (14, 16 or 13, 15) respectively, with their respective upper and lower surfaces being inverted. With this configuration, a simpler configuration can be used to establish a state where the first and second boundaries Q1 and Q2 intersect one another only at points by using identical parts for the pair of cutting blade bodies 13 and 14 and the driving bodies 15 and 16 while attaching these parts, with their respective upper and lower surfaces being inverted, and smooth reciprocating motion of the cutting blade bodies 13 and 14 can be more easily ensured.

Furthermore, in the first embodiment, the maximum width dimension D of the ends on the side of the engaging portions 31 to 34 of the cutting blade bodies 13 and 14 and the driving bodies 15 and 16 (that is, the base end portions of the cutting blade bodies 13 and 14 and the tip portions of the driving bodies 15 and 16) is set to a value that is larger by a predetermined amount than the width dimension Db at the base end sides of the driving bodies 15 and 16 and a width dimension Da of a part obtained by excluding the cutting blades 13a and 14a from the cutting blade bodies 13 and 14. With this configuration, deformation, caused by a concentration of stress, of the respective engaging portions 31 to 34 of the cutting blade bodies 13 and 14 and the driving bodies 15 and 16 can be effectively prevented, and an appropriate engaged state of the engaging portions 31 to 34 can be reliably maintained for long periods.

In other words, in cases where, as per the above configuration, the maximum width dimension D of the ends, on the side of the engaging portions 31 to 34, of the cutting blade bodies 13 and 14 and the driving bodies 15 and 16 is made larger than the width dimensions Da and Db of other parts, a larger contact area can be ensured between the cutting blade bodies 13 and 14 and the driving bodies 15 and 16 which engage with one another via the engaging portions 31 to 34, and therefore there is the advantage that deformation of the engaging portions 31 to 34, caused by an excessive concentration of stress thereon during the reciprocating motion of the cutting blade bodies 13 and 14 and the driving bodies 15 and 16, can be effectively prevented, and an appropriate engaged state (with minimal rattle) of the engaging portions 31 to 34 can be reliably maintained for long periods.

Note that, in the first embodiment above, dual-blade cutting blade bodies which include cutting blades 13a and 14a on their left and right lateral edges are used for the first and second cutting blade bodies 13 and 14, but the configuration of the present invention can be similarly applied to cases where the cutting blade bodies 13 and 14 are single-blade type cutting blade bodies which have the cutting blades 13a and 14a provided on only one of the left and right sides.

Furthermore, in the above first embodiment, engaging portions 33 and 34 formed by protrusions which include top portions 33a and 34a and flared portions 33b and 34b are provided at the tips of the driving bodies 15 and 16, while the engaging portions 31 and 32 with corresponding recesses 31a and 32a are provided at the base ends of the cutting blade bodies 13 and 14. Conversely however, engaging portions formed by protrusions of a predetermined shape may be provided at the base ends of the cutting blade bodies 13 and 14 while engaging portions with corresponding recesses may be provided at the tips of the driving bodies 15 and 16. This also applies to a second embodiment described hereinbelow.

Second Embodiment

Figure 10A:
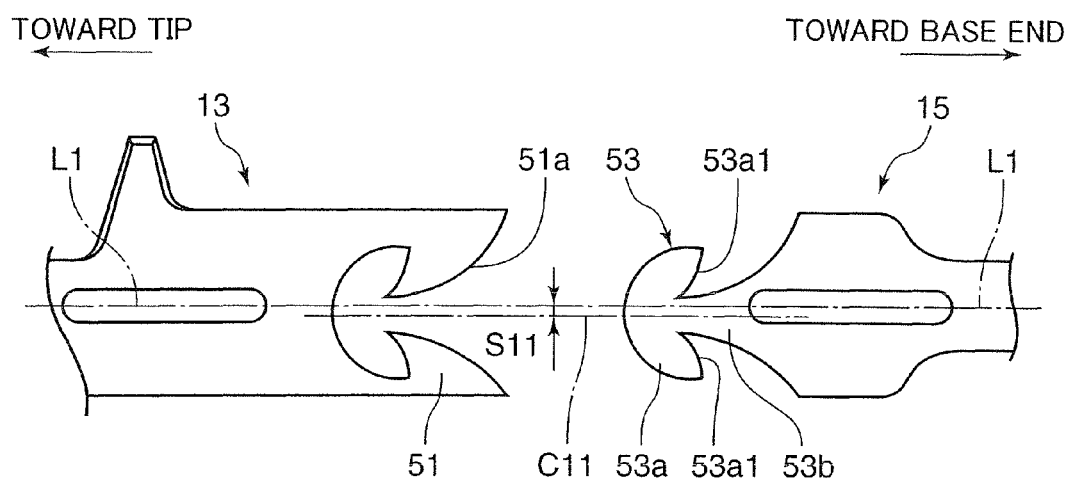
FIGS. 10A and 10B serve to illustrate a reciprocating-type cutting blade device according to a second embodiment of the present invention and are equivalent to FIGS. 4A and 4B.
Figure 10B:
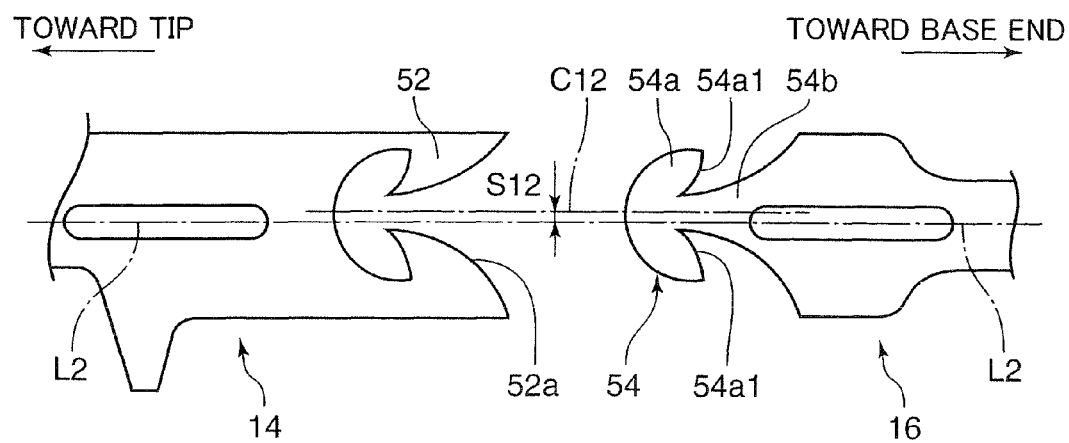

FIGS. 10A and 10B serve to illustrate a second embodiment of the present invention. In these figures, as shown in FIG. 10A, the tip of a first driving body 15 is provided with an engaging portion 53 which is formed by a protrusion having a top portion 53a and a flared portion 53b, similarly to the first embodiment. However, a difference from the first embodiment is that the top portion 53a of the engaging portion 53 is formed with a so-called arrowhead shape and includes an oblique side 53a1 that extends in an oblique direction from the tip of the flared portion 53b toward the base end side. Furthermore, as shown in the figures, the outline of the engaging portion 53 that includes the oblique side 53a1 is a completely curved line. Meanwhile, the base end of the first cutting blade body 13 is provided with an engaging portion 51 which includes a recess 51a corresponding to the engaging portion 53, and whose inner contour is completely curved. The center line C11 of these engaging portions 51 and 53 is offset by a predetermined distance S11 to one side in a width direction with respect to the axis L1 of the cutting blade body 13 and the driving body 15, and the shapes of the engaging portions 51 and 53 are asymmetrical to the axis L1.

As shown in FIG. 10B, the tip of the second driving body 16 is also provided with an engaging portion 54 which is formed by a protrusion having an arrowhead-shaped top portion 54a with oblique sides 54a1 and a flared portion 54b that extends from the top portion 54a toward the base end side, and the base end of the second cutting blade body 14 is provided with an engaging portion 52 which includes a recess 52a corresponding to the shape of the engaging portion 54. However, the orientation of the offset amount (offset amount of the center line C12 with respect to the axis L2 of the second cutting blade body 14 and the second driving body 16) S12 of the center line C12 of the engaging portions 52 and 54 is the opposite orientation from the offset amount S11 of the engaging portions 51 and 53 of the first cutting blade body 13 and the first driving body 15. To implement such a configuration simply, the first and second cutting blade bodies 13 and 14 and the first and second driving bodies 15 and 16 may, as per the first embodiment, be constituted by identical parts and have one of upper and lower surfaces thereof mutually inverted, for example.

Figure 11A:
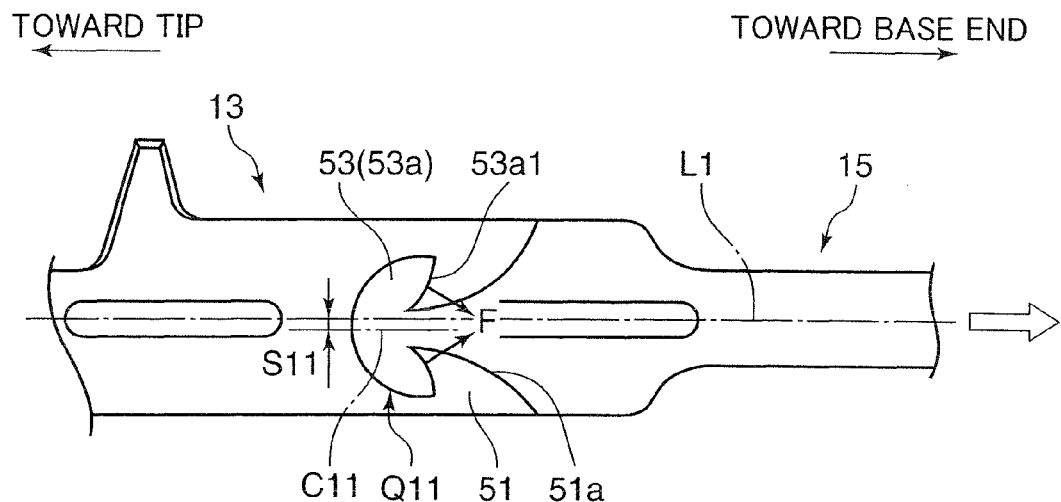
FIGS. 11A and 11B are equivalent to FIGS. 5A and 5B and show the reciprocating-type cutting blade device according to the second embodiment.
Figure 11B:
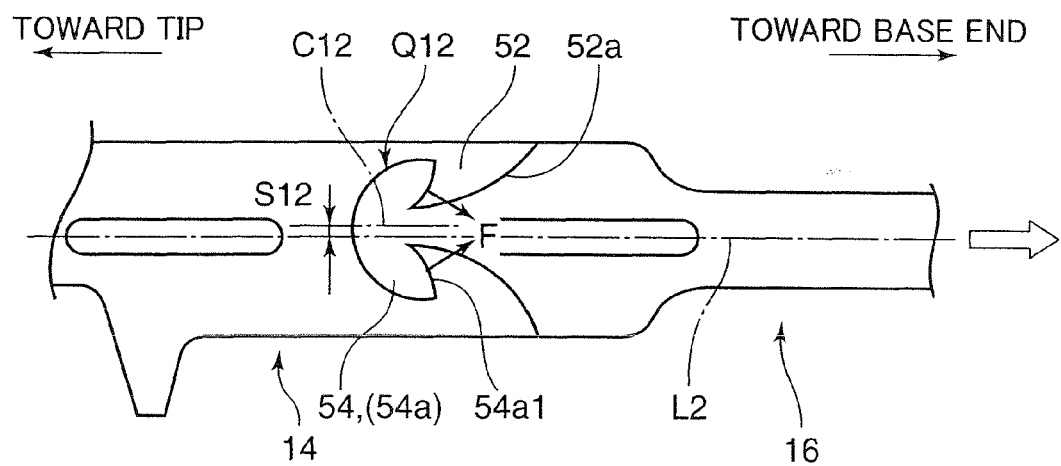
Figure 12:
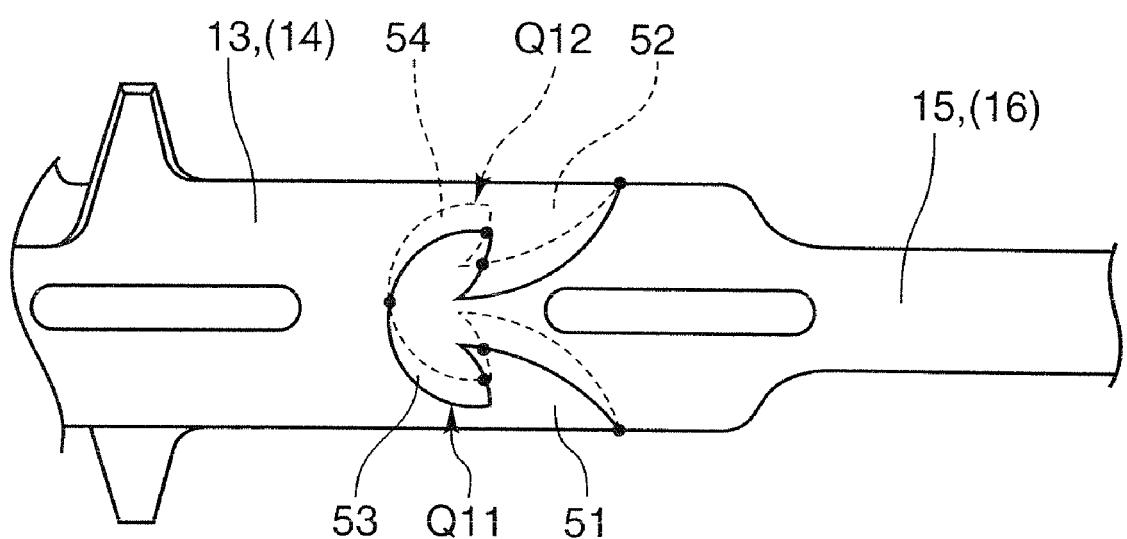
FIG. 12 is equivalent to FIG. 6 but for the second embodiment.

FIGS. 11A and 11B show a state where the first cutting blade body 13 and the first driving body 15 and the second cutting blade body 14 and the second driving body 16 are connected longitudinally via the engaging portions 51 and 53 and the engaging portions 52 and 54 respectively. In these figures, the reference symbol Q11 denotes a first boundary that is formed between the engaging portions 51 and 53, and the reference symbol Q12 denotes a second boundary that is formed between the engaging portions 52 and 54. As explained above, the planar shape of the first and second boundaries Q11 and Q12 are dissimilar shapes formed by only by curved lines. Hence, the two boundaries Q11 and Q12 intersect one another only at points in a planar view in a superposed state as shown in FIG. 12.

Furthermore, in the above configuration, when the driving bodies 15 and 16 are drawn toward the base end by the driving mechanism 6 (see FIG. 1 and so on) during the reciprocating motion of each of the cutting blade bodies 13 and 14, a force F that is directed inwards in the width direction acts on the engaging portions 51 and 52 of the cutting blade bodies 13 and 14 as the force that is applied by the engaging portions 53 and 54 (more specifically, the oblique sides 53a1 and 54a1 of the top portions 53a and 54a) of the driving bodies 15 and 16, as shown in FIG. 11. The force F which is oriented thus acts on the engaging portions 51 and 52 of the cutting blade bodies 13 and 14 in a direction that constricts the aperture of the recesses 51a and 52b, and therefore the recesses 51a and 52a are always fitted to their counterpart engaging portions 53 and 54, whereby rattle therebetween is effectively prevented. Note that in cases where the driving bodies 15 and 16 are pushed toward the opposite end (that is, the tip) from the one illustrated, the engaging portions 53 and 54 are pushed into close contact with the recesses 51a and 52a, and therefore the earlier-mentioned rattle problem does not exist to begin with.

Note that, in the first and second embodiments described hereinabove, the engaging portions (31, 32 or 51, 52) of the cutting blade bodies 13 and 14 and the engaging portions (33, 34 or 53, 54) of the driving bodies 15 and 16 are merely examples for the purpose of implementing the configuration of the present invention, in which the boundaries (Q1, Q2 or Q11, Q12) intersect one another only at points in a planar view, and the specific shapes of these parts can be changed in a variety of ways.

Figure 13:
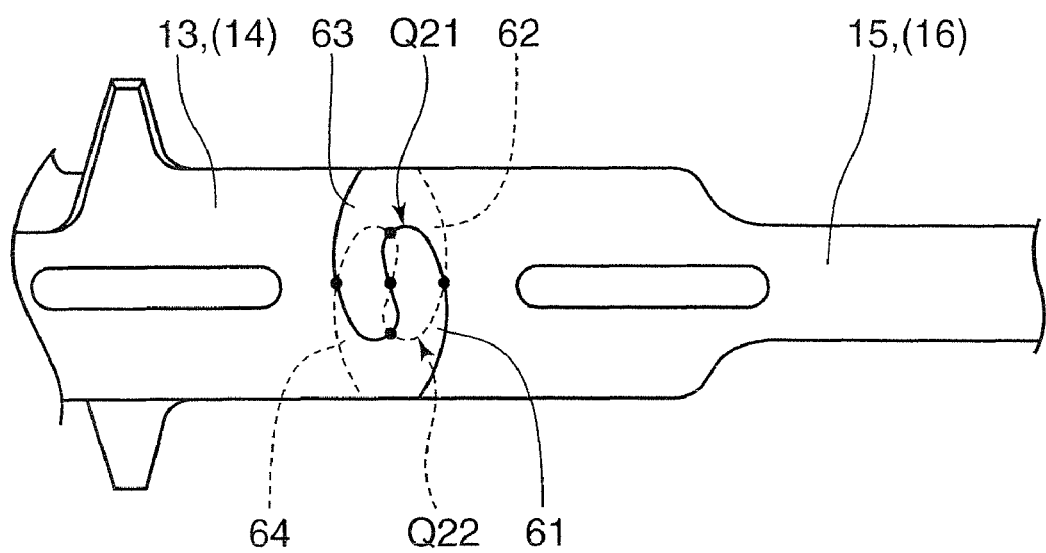
FIG. 13 serves to illustrate a modification of the present invention.

For example, as shown in FIG. 13, the engaging portions may be formed such that the boundary Q21 between engaging portions 61 and 63 of the first cutting blade body 13 and the first driving body 15 and the boundary Q22 between engaging portions 62 and 64 of the second cutting blade body 14 and the second driving body 16 trace dissimilar coil-like curved lines in a planar view (with line symmetry in the illustrated example).

Figure 14:
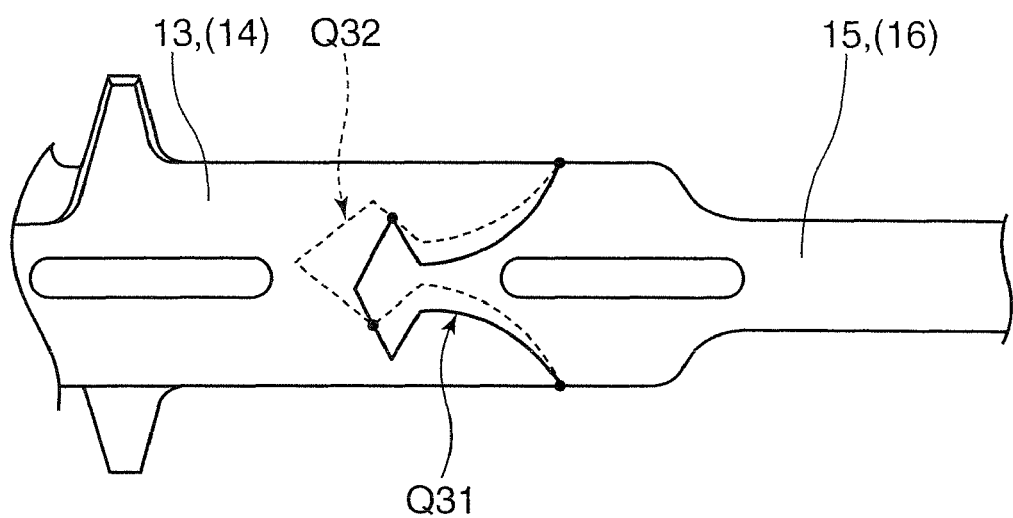
FIG. 14 serves to illustrate another modification of the present invention.

Furthermore, in the first and second embodiments and in the example in FIG. 13, the shapes of the engaging portions are determined so that the boundaries are completely curved. However, at least part of the boundaries may also include a straight line such as boundaries Q31 and Q32 shown in FIG. 14. However, in this case, the two boundaries must be prevented from overlapping linearly during reciprocating motion by rendering the straight lines in the boundaries Q31 and Q32 non-parallel lines.

Third Embodiment

In the first and second embodiments and modifications thereof described hereinabove, the configuration is such that the boundaries (Q1, Q2, for example) between the engaging portions of the cutting blade bodies 13 and 14 and the driving bodies 15 and 16 intersect each other only at points in a planar view, whereby smooth reciprocating motion of the cutting blade bodies 13 and 14 is ensured. However, a variety of other means for achieving this object may also be considered. An example of such means will now be described as a third embodiment.

Figure 15:
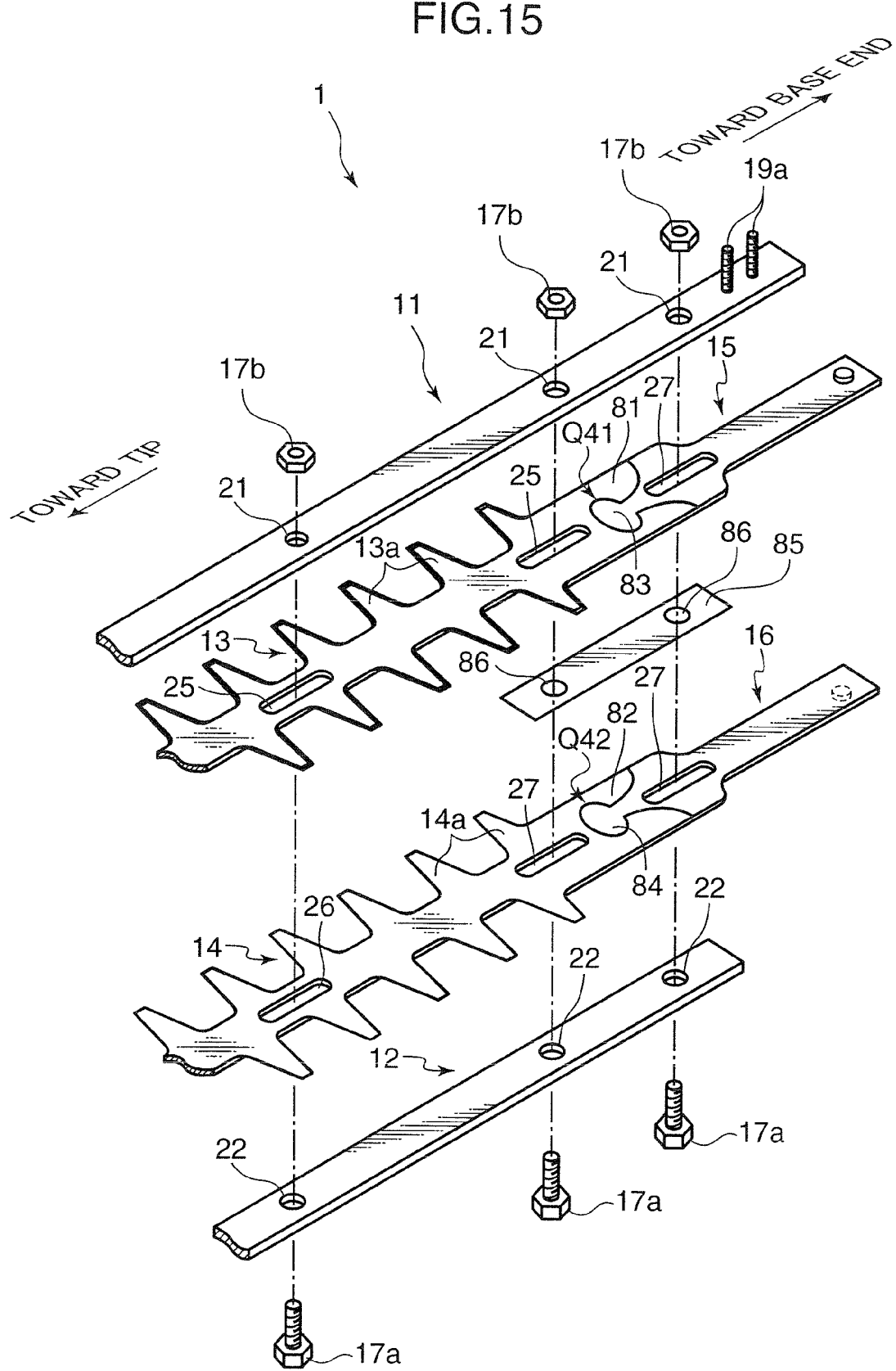
FIG. 15 is an exploded perspective view of a reciprocating-type cutting blade device according to a third embodiment.

As shown in FIG. 15, in the third embodiment, the first cutting blade body 13 and the first driving body 15 are connected in a longitudinal direction via engaging portions 81 and 83, and the second cutting blade body 14 and second driving body 16 are connected in a longitudinal direction via engaging portions 82 and 84. However, unlike the earlier first embodiment and so forth, in this embodiment, the engaging portions 81 and 82 of the first and second cutting blade bodies 13 and 14 and the engaging portions 83 and 84 of the corresponding first and second driving bodies each have the same shape in a planar view. Hence, with this configuration, a first boundary Q41, which is formed between the engaging portions 81 and 83 of the first cutting blade body 13 and the first driving body 15, and a second boundary Q42, which is formed between the engaging portions 82 and 84 of the second cutting blade body 14 and the second driving body 16, completely coincide in a planar view during the reciprocating motion, and hence there is a risk of the interference between the steps present at these boundaries Q41 and Q42.

Hence, in this embodiment, one thin plate 85, rectangular in a planar view, is disposed between a connecting part of the first cutting blade body 13 and the first driving body 15 (part where the engaging portions 81 and 83 engage with each other) and a connecting part of the second cutting blade body 14 and the second driving body 16 (part where the engaging portions 82 and 84 engage with each other). This thin plate 85 is created with a longitudinal dimension that is longer than the stroke of the cutting blade bodies 13 and 14 and the driving bodies 15 and 16 during reciprocating motion, and is configured so that the two connecting parts do not come into direct contact with each other. The first and second boundaries Q41 and Q42 are thus prevented from overlapping linearly and touching each other, thereby allowing the cutting blade bodies 13 and 14 to perform smooth reciprocating motion in a state where the thin plate 85 is held from both sides therebetween. Note that the reference numerals 86 in the figure denotes insertion holes for inserting the bolts 17a that connect the first and second guide plates 11 and 12 to one another.

Embodiment 4

Figure 16:
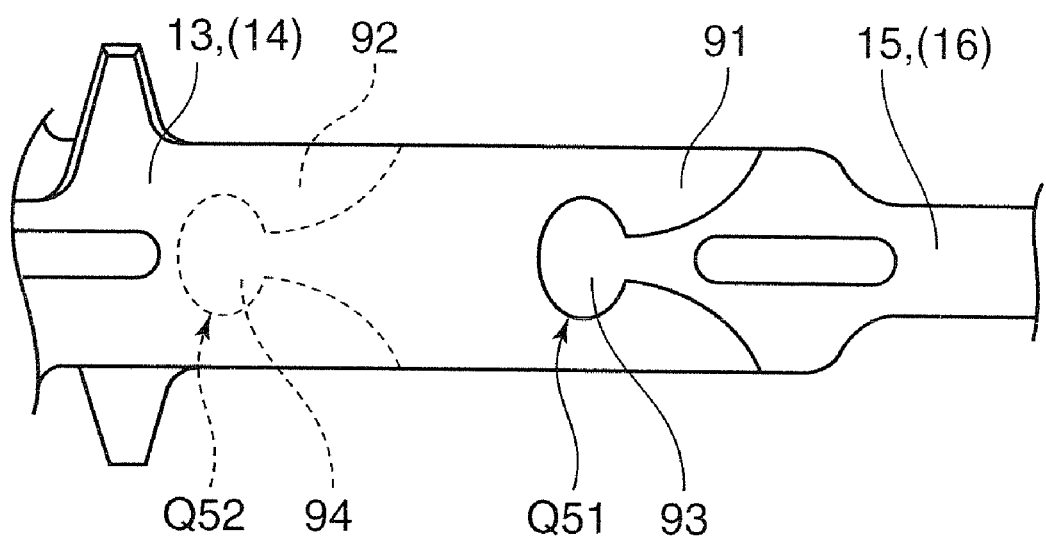
FIG. 16 is a planar view of the essential parts of a reciprocating-type cutting blade device according to a fourth embodiment.

In a fourth embodiment shown in FIG. 16, the configuration is such that the engaging portions 91 and 93 of the first cutting blade body 13 and the first driving body 15 and the engaging portions 92 and 94 of the second cutting blade body 14 and the second driving body 16 are provided in positions greatly spaced apart in a longitudinal direction, and such that there is no overlap at all between the boundaries Q51 and Q52 between the engaging portions 91 and 93 and the engaging portions 92 and 94 respectively over a whole stroke of reciprocating motion. With this configuration, the two boundaries Q51 and Q52 are thus prevented from overlapping linearly and touching each other, thereby allowing the cutting blade bodies 13 and 14 to perform smooth reciprocating motion.

Embodiment 5

Figure 17:
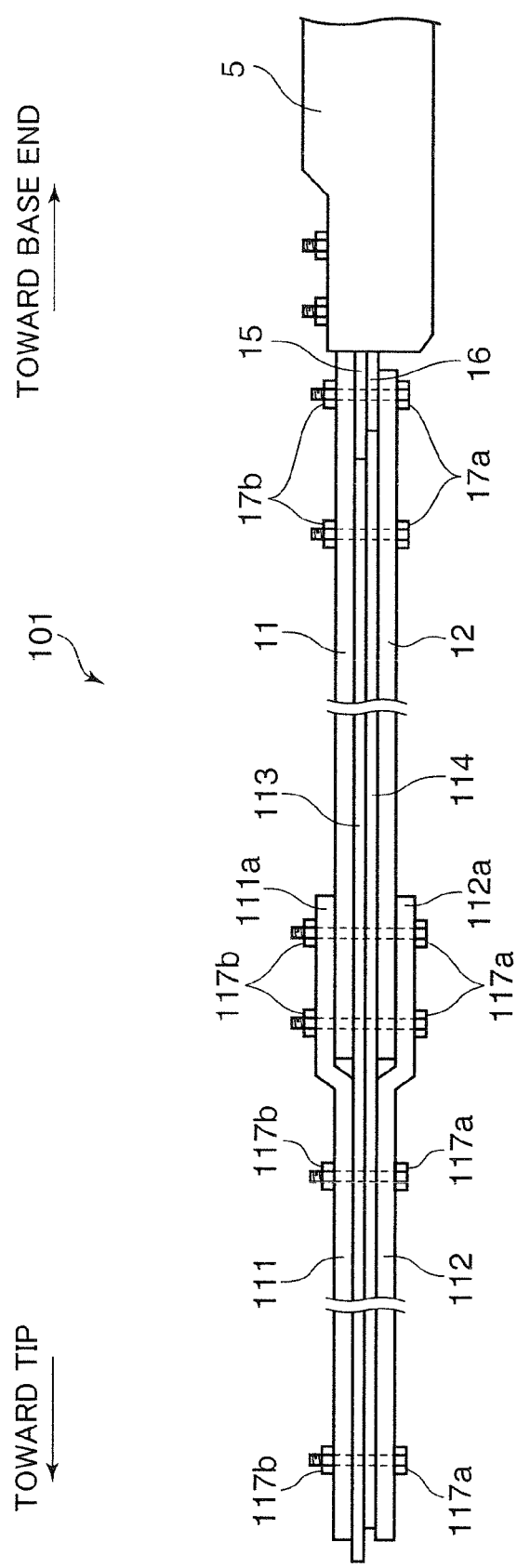
FIG. 17 is a side view of a reciprocating-type cutting blade device according to a fifth embodiment.

FIG. 17 is a side view of a reciprocating-type cutting blade device 101 according to a fifth embodiment of the present invention. In the reciprocating-type cutting blade device 101 shown in FIG. 17, first and second extension plates 111 and 112, which extend coaxially with the guide plates 11 and 12, are attached to the tips of the first and second guide plates 11 and 12.

The first and second extension plates 111 and 112 comprise plate-like bodies with the same width dimension as the first and second guide plates 11 and 12, and the base ends of the extension plates 111 and 112 are provided with step portions 111a and 112a with steps which have a thickness that corresponds to the thickness of the guide plates 11 and 12. Furthermore, the step portions 111a and 112a are secured by being fastened so that the tips of the guide plates 11 and 12 are held from both sides in the thickness direction, whereby the guide plates 11 and 12 and the extension plates 111 and 112 are connected substantially flush with one other in a longitudinal direction.

The first and second cutting blade bodies 113 and 114, which are longer in a fore-aft direction than the cutting blade bodies 13 and 14 of the earlier first embodiment, are held from both sides so as to be capable of moving reciprocatingly between the first guide plate 11 and the first extension plate 111 and the second guide plate 12 and the second extension plate 112. The first and second cutting blade bodies 113 and 114 and the first and second driving bodies 15 and 16 located at the base ends thereof are connected to each other via engaging portions (that is, engaging portions which have the same shape as the engaging portions 31 to 34 shown in FIGS. 3 to 8 and so on) as in the case of the earlier first embodiment, for example.

The extension plates 111 and 112 are connected to each other via a plurality of bolts 117a and nuts 117b which are provided in a line in the longitudinal direction. Among these bolts and nuts, two sets of bolts 117a and nuts 117b on the base end side are fastened in a state where the guide plates 11 and 12 and the cutting blade bodies 13 and 14 are held from both sides between the stepped portions 111a and 112a of the extension plates 111 and 112, and the guide plates 11 and 12 and the extension plates 111 and 112 are secured by being clamped in the thickness direction via the two sets of bolts and nuts. Note that although not shown in detail, the extension plates 111 and 112 and the guide plates 11 and 12 are provided with insertion holes into which the bolts 117a are inserted, and that the cutting blade bodies 113 and 114 are formed with long holes into which the bolts 117a are inserted and which are elongated in the longitudinal direction.

As described earlier, with the reciprocating-type cutting blade device 101 of the fifth embodiment, in which extension plates 111 and 112 are detachably fixed to the tip side of the pair of guide plates 11 and 12, there is the advantage that cutting blade bodies of a plurality of types with different lengths, that is, comparatively long cutting blade bodies 113 and 114 as per this embodiment, and shorter cutting blade bodies (the cutting blade bodies 13 and 14 used in the earlier first embodiment, for example) can be suitably used depending on the application by attaching or detaching the extension plates 111 and 112, whereby the user-friendliness of the reciprocating-type cutting blade device 101 can be further improved.

For example, unless means for extending the length of the guide plates 11 and 12 exists, only cutting blade bodies of substantially the same length can be attached between the guide plates 11 and 12. Hence, if the length of the cutting blade bodies is changed by a large amount, the guide plates 11 and 12 and the cutting blade bodies must both be replaced as a set. In contrast, when, as per the fifth embodiment, the configuration is such that the extension plates 111 and 112 are detachably fixed to the pair of guide plates 11 and 12, cutting blade bodies of different lengths can be slidably held in a suitable manner simply by attaching/detaching the extension plates 111 and 112, and hence cutting blade bodies of different lengths can be easily used depending on the length of the tree or hedge or the like to be cut, for example. The user-friendliness of the reciprocating-type cutting blade device 101 can therefore be improved with a simpler and lower cost configuration.

Note that although the extension plates 111 and 112 are attached to both the first and second guide plates 11 and 12 in the fifth embodiment above. For example, similarly to the reciprocating-type cutting blade device 101' shown in FIG. 18, the extension plate 111 alone may be attached to the first guide plate 11 that is located in a relatively high position and fixed to the mission case 5, and the extension plate 112 (see FIG. 17) attached to the lower second guide plate 12 need not be included. In this case, as shown in FIG. 18, a washer 117c consisting of a spring washer or the like is preferably provided between the heads of the bolts 117a for fastening the extension plate 111 and the second cutting blade body 114 to which the bearing surface of the heads of the bolts 117a are clamped. As a result, a larger surface area can be ensured for the clamped part than in a case where no washer 117c is provided, and consequently the cutting blade bodies 113 and 114 can be held from both sides in the thickness direction with an appropriate force while being made to perform a comparatively smooth reciprocating motion. Furthermore, by omitting the extension plate 112 attached to the second guide plate 12 (see FIG. 17), the overall weight of the reciprocating-type cutting blade device 101' can be effectively reduced.

Further, a structure such as that shown in FIG. 18, that is, a structure in which the lengths of the members (11, 111, and 12) for holding the cutting blade bodies 113 and 114 from both sides in the thickness direction differ vertically can be adopted in the same way as in the above-described first embodiment. For example, in the configuration of the first embodiment shown in FIGS. 1 to 3 and so on, the second guide plate 12 is shorter than the first guide plate 11, and at the tip portion where the second guide plate 12 is not present, the cutting blade bodies 13 and 14 may be fastened directly to the first guide plate 11 using bolts and nuts or the like, as per the earlier example. However, in this case, at least the connecting part that connects the cutting blade bodies 13 and 14 and the driving bodies 15 and 16 (part where the engaging portions 31 to 34 are installed) should be held from above and below by both the first guide plate 11 and the second guide plate 12 in order to construct a stable connection structure.

Embodiment 6

FIG. 19 is a side view of a reciprocating-type cutting blade device 151 according to a sixth embodiment of the present invention. In the reciprocating-type cutting blade device 151 shown in FIG. 19, the first and second guide plates 11 and 12 are connected to one another via a bolt 157a that passes through the guide plates 11 and 12 in a thickness direction and a nut 157b that is threaded onto the tip of the bolt 157a. However, a biasing member 157c comprising a coil spring is attached in a compression state as means for biasing the nut 157b and the guide plate (first guide plate 11 in the illustration), on the side where the nut is attached, in a direction in which the nut 157b and the guide plate are separated from each other. Note that the configuration of the other members (the cutting blade bodies 13 and 14, for example) is the same as in the first embodiment above.

Figure 20A:
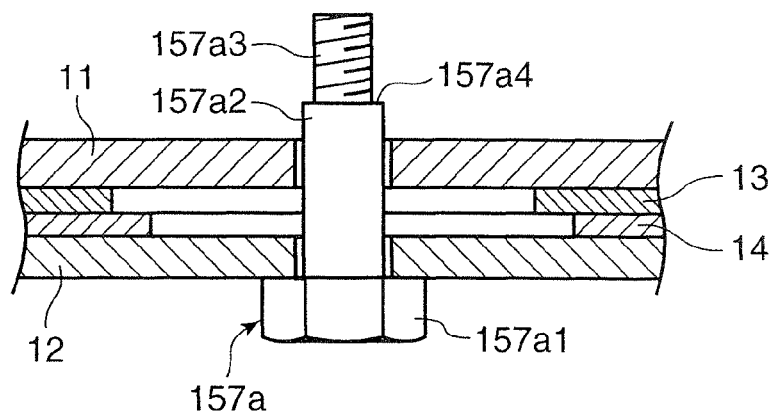
FIGS. 20A to 20C serve to illustrate a nut and bolt structure for connecting first and second nut plates according to the sixth embodiment.

FIG. 20A shows a state where the nut 157b and the biasing member 157c have been removed from the bolt 157a. As shown in FIG. 20A, the bolt 157a includes a head 157a1, a main shaft portion 157a2 provided protrudingly from the head 157a1, and a screw portion 157a3 which is provided at the tip of the main shaft portion 157a2 and whose circumference is provided with a male thread surface onto which the nut 157b is threaded. The shaft of the bolt 157a, that is, the part comprising the main shaft portion 157a2 and the screw portion 157a3, is formed with a stepped portion 157a4. In other words, the screw portion 157a3 of the bolt 157a is formed with a smaller diameter than the main shaft portion 157a2, and the stepped portion 157a4 is formed between the screw portion 157a3 and the main shaft portion 157a2.

Figure 20B:
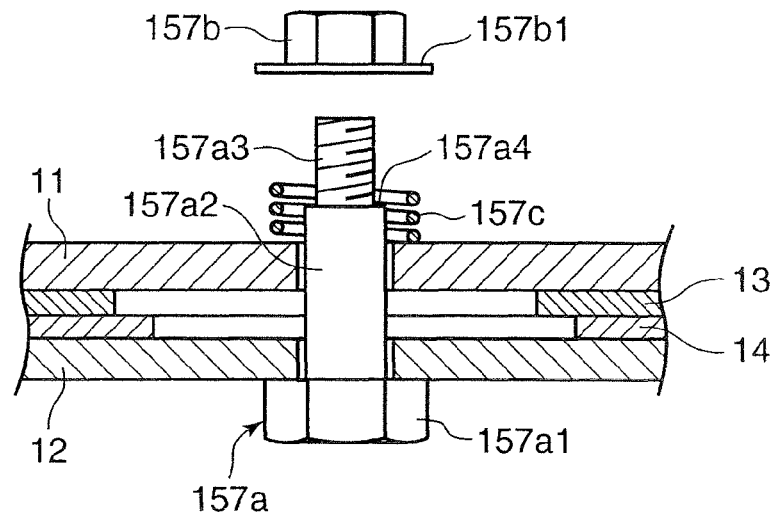
Figure 20C:
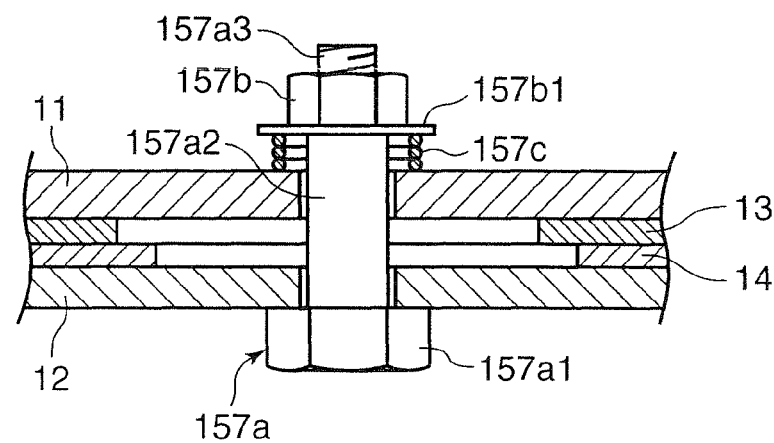
Figure 21:
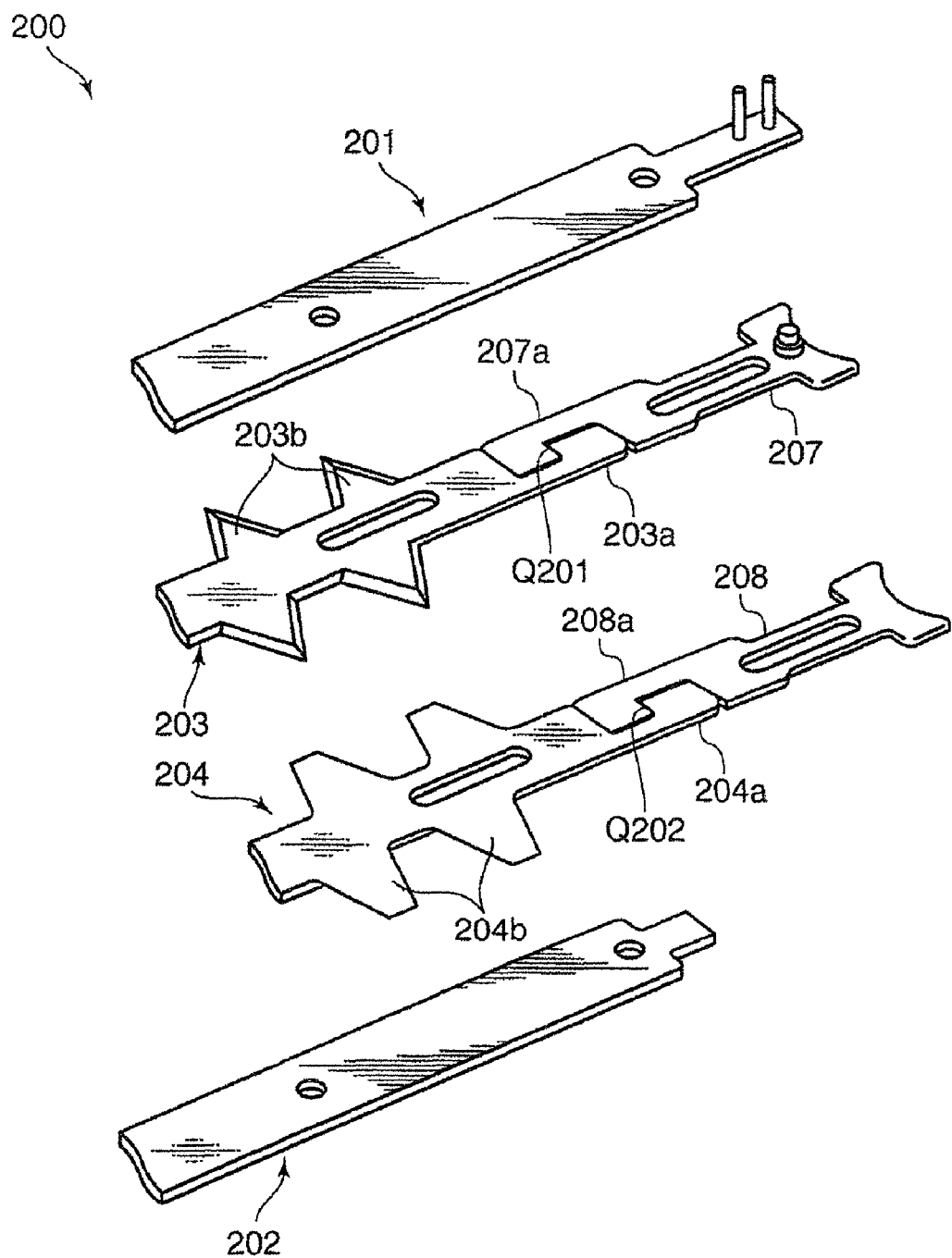
FIG. 21 is an exploded perspective view serving to illustrate a conventional example of a reciprocating-type cutting blade device.
Figure 22A:
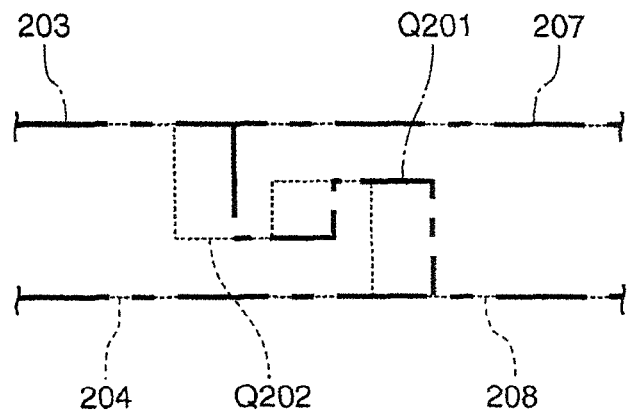
FIGS. 22A to 22C are schematic diagrams serving to illustrate the action of the conventional example of a reciprocating-type cutting blade device.
Figure 22B:
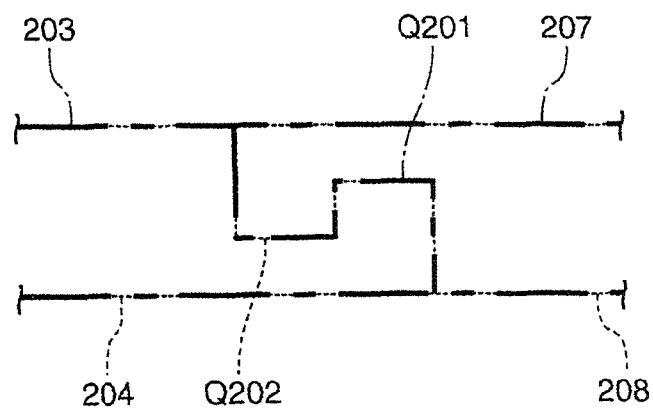
Figure 22C:
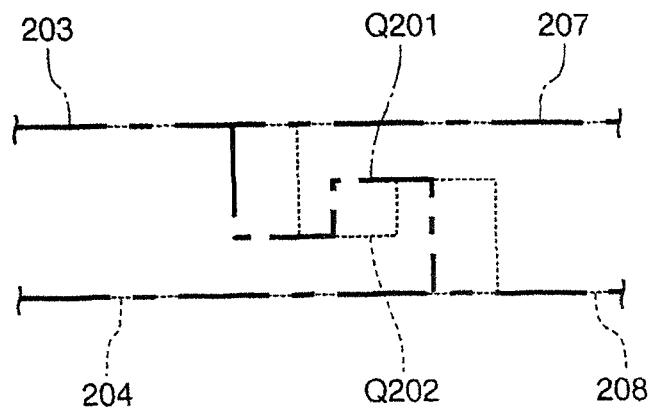

The stepped portion 157a4 is positioned at a height that is a predetermined distance from the wall surface of the guide plate on the nut 157b side (that is, the upper first guide plate 11) in a state where the bolt 157a is completely inserted. Hence, as shown in FIGS. 20B and 20C, when the nut 157b is threaded onto the screw portion 157a3, a bottom 157b1 of the nut 157b butts against the stepped portion 157a4, thereby ensuring that the nut 157b cannot move from the position of the stepped portion 157a4 in the fastening direction (that is, a direction toward the wall surface of the guide plate 11). Note that the nut 157b in the figure is a so-called flanged nut and that the bottom 157b1 is formed as a washer.

As shown in FIG. 20B, the initial axial length of the biasing member 157c is created longer than the vertical distance from the wall surface of the first guide plate 11 to the stepped portion 157a4. Hence, as shown in FIG. 20C, when the nut 157b is fastened to the point where it butts against the stepped portion 157a4 of the bolt 157a, the biasing member 157c is sandwiched between and compressed by the guide plate 11 and the bottom 157b of the nut 15b, whereby the first guide plate 11 and the nut 157b are biased in such a direction that their separation distance increases by the biasing member 157c.

With the configuration of the sixth embodiment as described above, when the pair of guide plates 11 and 12 are fastened using the bolts and nuts 157a and 157b in order to re-assemble the device after the cutting blade bodies 13 and 14 have been exchanged, if the operator fastens the nut 157b to the point where the nut butts against the stepped portion 157a4 of the bolt 157a, a predetermined fastening force can be generated between the pair of guide plates 11 and 12 due to the repulsion force from the biasing member 157c that is provided between the nut 157b and the guide plate 11. There is therefore the advantage that through the simple task of completely fastening the nut 157b to the point where the nut butts against the stepped portion 157a4, the pair of guide plates 11 and 12 can always be fastened with an appropriate fastening force, and the cutting blade bodies 13 and 14 which are held from both sides between the guide plates 11 and 12 can be held stably in a suitable assembled state (a state where the cutting blade bodies 13 and 14 are able to perform smooth and rattle-free reciprocating motion).

Moreover, since the biasing member 157c is provided between the nut 157b and the guide plate 11, even when behavior where one of the cutting blade bodies (the first cutting blade body 13 located on the nut 157b side) rises slightly above the other cutting blade body 14 due to foreign matter such as vegetation or pebbles becoming sandwiched between the pair of cutting blade bodies 13 and 14 when the reciprocating-type cutting blade device 151 is used, for example, this rise can be absorbed by the elasticity of the biasing member 157c. Hence, there is the advantage that, even if foreign matter should be trapped in this way, a situation where the reciprocating motion of the cutting blade bodies 13 and 14 stops due to the presence of foreign matter can be prevented, whereby the user-friendliness of the reciprocating-type cutting blade device 151 can be effectively improved.

In the last place, features and advantages of the invention disclosed based on the above embodiments will be summarized as follows.

The present invention is a reciprocating-type cutting blade device that has: first and second driving bodies formed by a pair of plate-like bodies which are superposed in a thickness direction and reciprocatingly driven in opposite directions by a predetermined driving mechanism; first and second cutting blade bodies formed by a pair of plate-like bodies which are integrally reciprocatingly driven by detachably engaging with non-drive side ends of the first and second driving bodies and which have cutting blades having a predetermined shape on lateral edges thereof; and a pair of detachable guide plates which are disposed on both sides of the cutting bodies and driving bodies in the thickness direction so as to hold the cutting bodies and driving bodies slidably, the reciprocating-type cutting blade device being characterized in that a first boundary, which is formed between engaging portions of the first cutting blade body and the first driving body, and a second boundary, which is formed between engaging portions of the second cutting blade body and the second driving body, intersect one another only at points in a planar view, and the engaging portions of the cutting blade bodies and the driving bodies are formed so that this state of intersection is maintained over a whole stroke of reciprocating motion.

According to the present invention, the first and second cutting blade bodies detachably engage with the first and second driving bodies which are reciprocatingly driven by a driving mechanism, and since these members are slidably held from both sides between a pair of guide plates, an operator of this device is able to easily remove the cutting blade bodies from the driving bodies upon separating the pair of guide plates, thereby allowing maintenance work such as re-grinding of the blades of the cutting blade bodies to be performed easily in a state where the cutting blades have been removed thus.

Moreover, since the first boundary formed between the engaging portions of the first cutting blade body and the first driving body, and the second boundary formed between the engaging portions of the second cutting blade body and the second driving body intersect each other only at points over a whole stroke of reciprocating motion, even in a case where a step caused by thickness dimension errors with the cutting blade bodies and driving bodies is generated in part of the boundaries, for example, there is no line contact between these steps, and obstruction of the reciprocating motion of the cutting blade bodies which would otherwise be caused by interference due to such line contact can be effectively avoided. As a result, the reciprocating motion of the cutting blade bodies can be effectively smoothed while adequately ensuring their maintainability, and the performance of the reciprocating-type cutting blade device can be raised while effectively improving its workability.

Preferably, in the present invention, the first and second boundaries are preferably only curved lines with different shapes in a planar view.

With this configuration, there is the advantage that a state, as described above, where both the boundaries intersect one another only at points can be suitably established and that smooth reciprocating motion of the cutting blade bodies can be ensured.

Preferably, in the above configuration, the first and second cutting blade bodies and the first and second driving bodies are formed by identical parts, which have engaging portions that are axially asymmetric, and one of the cutting blade bodies and one of the driving bodies are attached to the other one of the cutting blade bodies and the other one of the driving bodies respectively, with respective upper and lower surfaces thereof being inverted.

With this configuration, by using identical parts for the pairs of cutting blade bodies and driving bodies while attaching these parts, with their upper and lower faces mutually being inverted, a simpler configuration can be used to establish a state where the first and second boundaries intersect one another only at points, and smooth reciprocating motion of the cutting blade bodies can be easily ensured.

Preferably, in the above configuration, either one of the respective engaging portions of the cutting blade bodies and the driving bodies is constituted by a protrusion having a predetermined shape that is protrudingly provided in the longitudinal direction, while the other one of the respective engaging portions has a recess that is cut out to correspond to the one of the engaging portions, and the engaging portions of the cutting blade bodies and driving bodies are formed such that a force that acts on the other one of the engaging portions during reciprocating motion acts in a direction that constricts an aperture width of the recess.

With this configuration, there is the advantage that the recess that is provided in the other one of the engaging portions is always fitted to its counterpart engaging portion, and therefore rattle therebetween can be effectively prevented.

Preferably, in the present invention, a maximum width dimension of respective engaging portion-side ends of the cutting blade bodies and driving bodies is set at a value that is larger by a predetermined amount than the width dimension of the base end of the driving body and the width dimension of the part of the cutting blade body excluding the cutting blade.

With the above configuration, there is the advantage that deformation, caused by a concentration of stress, of the respective engaging portions of the cutting blade bodies and driving bodies can be effectively prevented, and an appropriate engaged state of the engaging portions can be reliably maintained for long periods.

Preferably, in the prevent invention, an extension plate that extends in a direction coaxial with the pair of guide plates is preferably detachably fixed to at least one tip thereof.

With this configuration, there is the advantage that cutting blade bodies of a plurality of types with different lengths can be suitably used depending on the application by attaching/detaching an extension plate to/from the guide plates, and that the user-friendliness of the reciprocating-type cutting blade device can be improved further.

Preferably, in the present invention, the pair of guide plates are connected to each other by a bolt that penetrates the guide plates in a thickness direction and a nut that is threaded onto the tip of the bolt, a stepped portion against which the bottom of the nut butts during fastening is provided in a position on the shaft of the bolt, with the position being spaced apart from a wall surface of the guide plate, and a biasing member that biases the nut and the guide plate in such a direction that their separation distance increases is provided between the bottom of the nut and the guide plate.

With this configuration, when a bolt and nut are used to fasten the pair of guide plates, if the operator fastens the nut to the point where the nut butts against the stepped portion of the bolt, a predetermined fastening force can be generated between the pair of guide plates due to a repulsion force from the biasing member that is provided between the nut and the guide plate. Hence, there is the advantage that through the simple task of securely fastening the nut until the nut butts against the stepped portion, the pair of guide plates can always be fastened with a suitable fastening force and the cutting blade bodies held between the guide plates can be held stably in a suitable assembled state (a state in which the cutting blade bodies are able to perform smooth and rattle-free reciprocating motion).

The invention claimed is:

1. A reciprocating-type cutting blade device, having:
    first and second driving bodies formed by a pair of plate-like bodies which are superposed in a thickness direction and reciprocatingly driven in opposite directions by a predetermined driving mechanism;
    first and second cutting blade bodies formed by a pair of plate-like bodies which are integrally reciprocatingly driven by and detachably engaging with non-drive side ends of the first and second driving bodies and which have cutting blades having a predetermined shape on lateral edges thereof; and
    a pair of detachable guide plates which are disposed on both sides of the cutting bodies and driving bodies in the thickness direction so as to hold the cutting bodies and driving bodies slidably,
    the reciprocating-type cutting blade device being characterized in that
    a first boundary is formed between engaging portions of the first cutting blade body and the first driving body, and a second boundary is formed between engaging portions of the second cutting blade body and the second driving body, the first and second boundaries intersect one another only at non-contiguous points in a planar view at all positions during reciprocating motion of the cutting blade bodies and the driving bodies and so that at no point during the reciprocating motion does a line segment of the first boundary register with a line segment of the second boundary.

2. The reciprocating-type cutting blade device according to claim 1, characterized in that the first and second boundaries comprise only curved lines with mutually different shapes in a planar view.

3. The reciprocating-type cutting blade device according to claim 2, characterized in that the first and second cutting blade bodies and the first and second driving bodies are formed by identical parts, which have engaging portions that are axially asymmetric, and one of the cutting blade bodies and one of the driving bodies are attached to the other one of the cutting blade bodies and the other one of the driving bodies respectively, with respective upper and lower surfaces thereof being inverted.

4. The reciprocating-type cutting blade device according to claim 2, characterized in that
    either one of the respective engaging portions of the cutting blade bodies and the driving bodies is constituted by a protrusion having a predetermined shape that is protrudingly provided in the longitudinal direction, while the other one of the respective engaging portions has a recess that is cut out to correspond to the one of the engaging portions, and
    the engaging portions of the cutting blade bodies and driving bodies are formed such that a force that acts on the other one of the engaging portions during reciprocating motion acts in a direction that constricts an aperture width of the recess.

5. The reciprocating-type cutting blade device according to claim 1, characterized in that a maximum width dimension of respective engaging portion-side ends of the cutting blade bodies and driving bodies is set at a value that is larger by a predetermined amount than a width dimension of a driven end of the driving body and a width dimension of a part of the cutting blade body excluding the cutting blade.

6. The reciprocating-type cutting blade device according to claim 1, characterized in that an extension plate that extends in a direction coaxial with the pair of guide plates is detachably fixed to at least one tip of at least one of the guide plates.

7. The reciprocating-type cutting blade device according to claim 1, characterized in that
    the pair of guide plates are connected to each other by a bolt that penetrates the guide plates in a thickness direction and a nut that is threaded onto the tip of the bolt,
    a stepped portion against which the bottom of the nut butts during fastening is provided in a position on the shaft of the bolt, with the position being spaced apart from a wall surface of the guide plate, and
    a biasing member that biases the nut and the guide plate in such a direction that their separation distance increases is provided between the bottom of the nut and the guide plate.

8. The reciprocating-type cutting blade device according to claim 1, characterized in that neither the first boundary nor the second boundary has a linear segment aligned perpendicular to the opposite directions of the reciprocating motion.

9. A reciprocating-type cutting blade device, comprising:
    first and second plates-shaped driving bodies reciprocatingly driven in opposite directions by a driving mechanism; and
    first and second plate-shaped cutting blade bodies detachably engaged respectively with non-drive ends of the first and second driving bodies so that the first and second cutting blade bodies are reciprocatingly driven in the opposite directions with the first and second driving bodies, a first boundary being formed between engaging portions of the first cutting blade body and the first driving body and a second boundary being formed between engaging portions of the second cutting blade body and the second driving body, the first and second boundaries registering with one another only at non-contiguous points in a planar view of the plate-shaped driving bodies and the plate-shaped cutting blade bodies at all positions during reciprocating motion of the cutting blade bodies and the driving bodies so that at no point during the reciprocating motion does a line segment of the first boundary register with a line segment of the second boundary.

10. The reciprocating-type cutting blade device according to claim 9, characterized in that the first and second boundaries comprise only curved lines with mutually different shapes in a planar view.

11. The reciprocating-type cutting blade device according to claim 10, characterized in that the first and second cutting blade bodies and the first and second driving bodies are formed by identical parts, which have engaging portions that are axially asymmetric, and one of the cutting blade bodies and one of the driving bodies are attached to the other one of the cutting blade bodies and the other one of the driving bodies respectively, with respective upper and lower surfaces thereof being inverted.

12. The reciprocating-type cutting blade device according to claim 9, characterized in that neither the first boundary nor the second boundary has a linear segment aligned perpendicular to the opposite directions of the reciprocating motion.

* * * * *